United States Patent
Okamoto

(10) Patent No.: US 11,663,571 B2
(45) Date of Patent: *May 30, 2023

(54) INVENTORY MANAGEMENT COMPUTER SYSTEM

(71) Applicant: TOSHIBA TEC KABUSHIKI KAISHA, Tokyo (JP)

(72) Inventor: Kentaro Okamoto, Izunokuni Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 22 days.

This patent is subject to a terminal disclaimer.

(21) Appl. No.: 17/367,441

(22) Filed: Jul. 5, 2021

(65) Prior Publication Data
US 2021/0334777 A1    Oct. 28, 2021

Related U.S. Application Data

(63) Continuation of application No. 16/581,021, filed on Sep. 24, 2019, now Pat. No. 11,087,300, which is a (Continued)

(30) Foreign Application Priority Data

Feb. 21, 2017    (JP) .............................. JP2017-029878

(51) Int. Cl.
*G06Q 20/20* (2012.01)
*G06Q 10/087* (2023.01)
(Continued)

(52) U.S. Cl.
CPC ......... *G06Q 20/203* (2013.01); *G06Q 10/087* (2013.01); *G06Q 20/40145* (2013.01); *G06Q 30/0202* (2013.01); *G06V 40/16* (2022.01)

(58) Field of Classification Search
CPC ............... G06Q 20/203; G06Q 10/087; G06Q 20/40145; G06Q 30/0202; G06Q 2220/00; G06Q 20/065; G06V 40/16; H04L 9/50
(Continued)

(56) References Cited

U.S. PATENT DOCUMENTS

2006/0206246 A1* 9/2006 Walker ................... G06Q 10/00
701/16
2008/0103941 A1* 5/2008 Hussain ............... G06Q 10/087
705/28
(Continued)

FOREIGN PATENT DOCUMENTS

JP    2002-140770 A    5/2002

OTHER PUBLICATIONS

Akter et al. "Big data analytics in E-commerce: a systematic review and agenda for future research," Electron Markets, vol. 26, No. 2, Mar. 16, 2016, pp. 173-194.
(Continued)

*Primary Examiner* — Garcia Ade
(74) *Attorney, Agent, or Firm* — Kim & Stewart LLP

(57) ABSTRACT

A computer system includes an inventory management server, a plurality of point-of-sale (POS) terminals communicating with the inventory management server over a first network, a face recognition computer having a camera communicating with the inventory management server over the first network, and a portable terminal communicating wirelessly with the inventory management server over a second network. The inventory management server is configured to generates alerts that are displayed on the portable terminal based on first data from the POS terminals and second data from the face recognition computer.

20 Claims, 18 Drawing Sheets

Related U.S. Application Data continuation of application No. 15/875,368, filed on Jan. 19, 2018, now Pat. No. 10,482,444.

(51) Int. Cl.
*G06Q 30/0202* (2023.01)
*G06Q 20/40* (2012.01)
*G06V 40/16* (2022.01)

(58) Field of Classification Search
USPC .......................................................... 705/22
See application file for complete search history.

(56) References Cited

U.S. PATENT DOCUMENTS

| | | | |
|---|---|---|---|
| 2008/0249866 A1 | 10/2008 | Angell et al. | |
| 2012/0209734 A1* | 8/2012 | Brooks | G06Q 20/085 705/23 |
| 2015/0178671 A1* | 6/2015 | Jones | G06Q 10/087 705/28 |
| 2015/0269642 A1 | 9/2015 | Cai et al. | |
| 2016/0019547 A1* | 1/2016 | Gurnani | G06Q 20/40145 705/44 |
| 2016/0171432 A1* | 6/2016 | Pugh | G06Q 30/0635 705/14.23 |
| 2016/0203499 A1 | 7/2016 | Yamashita et al. | |
| 2019/0385107 A1* | 12/2019 | Renfroe | G06Q 30/0207 |

OTHER PUBLICATIONS

Extended European Search Report dated Apr. 24, 2018 in corresponding European Patent Application No. 18155567.3, 9 pages.

\* cited by examiner

| | f1 | f2 | f3 | f4 | f5 | f6 |
|---|---|---|---|---|---|---|
| | No | CUSTOMER ID | CUSTOMER NAME | FEATURE VALUE TYPE | FEATURE VALUE AMOUNT | REGULAR |
| | 1 | 0001 | CUSTOMER A | FEATURE AMOUNT Q1 | V1~V2 | TRUE |
| | 2 | 0002 | CUSTOMER B | FEATURE AMOUNT Q2 | V5 OR GREATER | TRUE |
| | 3 | 0003 | CUSTOMER C | FEATURE AMOUNT Q1 | V3~V4 | FALSE |
| | ... | ... | ... | ... | ... | ... |

(a) CUSTOMER ATTRIBUTE INFORMATION

F3b

| f7 | f8 | f9 | f10 | f11 |
|---|---|---|---|---|
| CUSTOMER ID | COMMODITY ID | COMMODITY NAME | QUANTITY | PURCHASE DATE |
| 0001 | 2222 | COMMODITY A | 10 | 2015/12/10 |
| 0001 | 3193 | COMMODITY B | 2 | 2015/12/10 |
| ... | ... | ... | ... | ... |

(b) PURCHASE HISTORY INFORMATION

FIG.8

| COMMODITY ID (f20) | COMMODITY NAME (f21) | DISPLAY QUANTITY (f22) | BACK OFFICE INVENTORY QUANTITY (f23) | COMMODITY DISPLAY OBJECT (f24) |
|---|---|---|---|---|
| 2222 | COMMODITY A | 10 | 150 | ☑ |
| 3193 | COMMODITY B | 5 | 15 | ☑ |
| 4433 | COMMODITY C | 23 | 15 | ☐ |
| ... | ... | ... | ... | ... |

FIG.9

M1 — CUSTOMER ENTERS THE STORE
M2 — VISITING CUSTOMER: CUSTOMER A

| COMMODITY ID | COMMODITY NAME | DISPLAY QUANTITY | BACK OFFICE INVENTORY QUANTITY | COMMODITY DISPLAY OBJECT |
|---|---|---|---|---|
| 2222 | COMMODITY A | 10 | 150 | ☑ |
| 3193 | COMMODITY B | 5 | 15 | ☑ |
| 4433 | COMMODITY C | 23 | 15 | ☐ |
| ... | ... | ... | ... | ... |

PLEASE DISPLAY COMMODITIES WHICH ARE COMMODITY DISPLAY OBJECTS ON COMMODITY SHELF.

[ I-GO ]  B1

FIG.10
(a) CUSTOMER DETECTION APPARATUS 70a SIDE
(b) STORE SERVER 10a SIDE
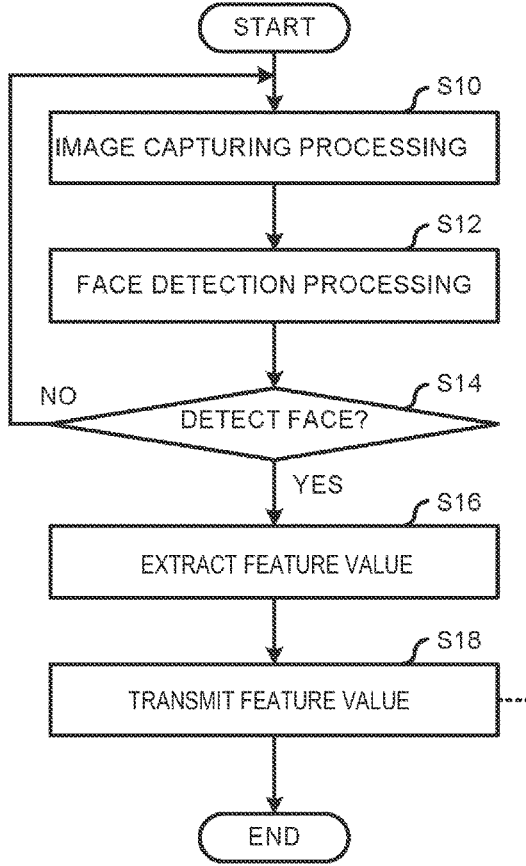
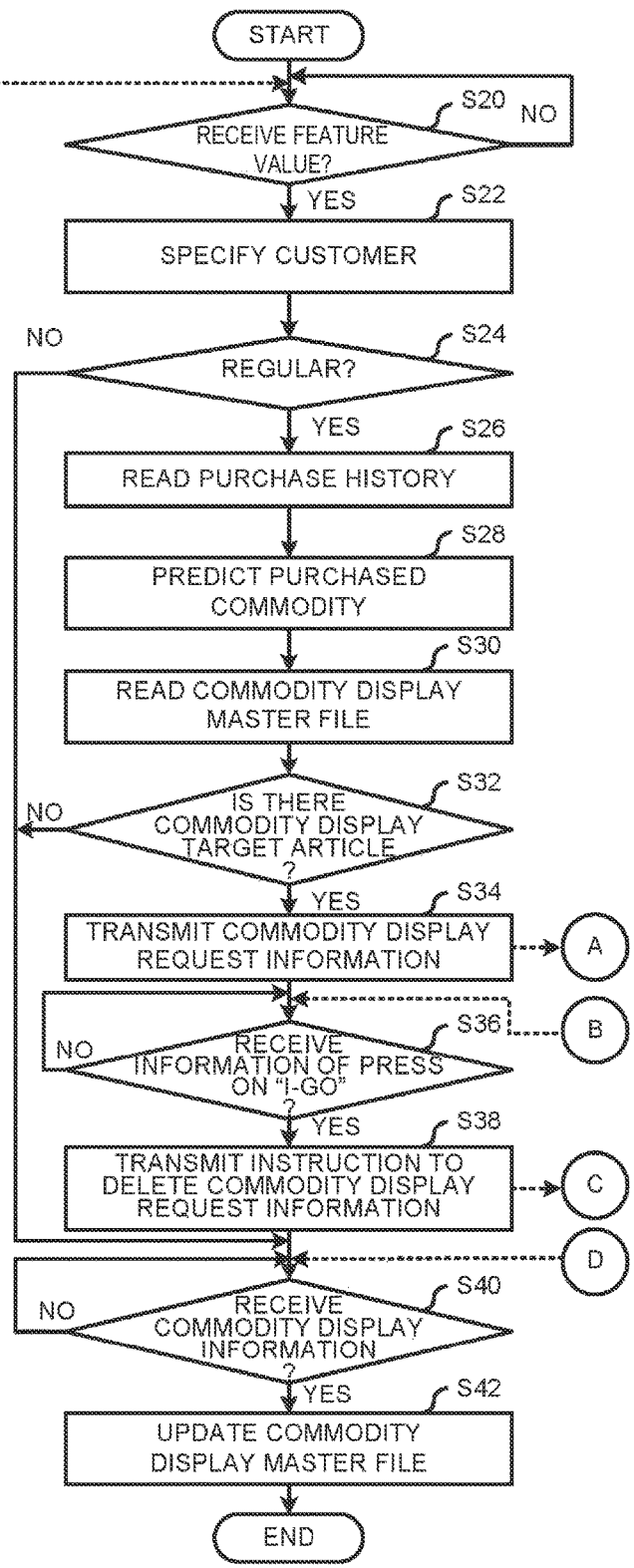

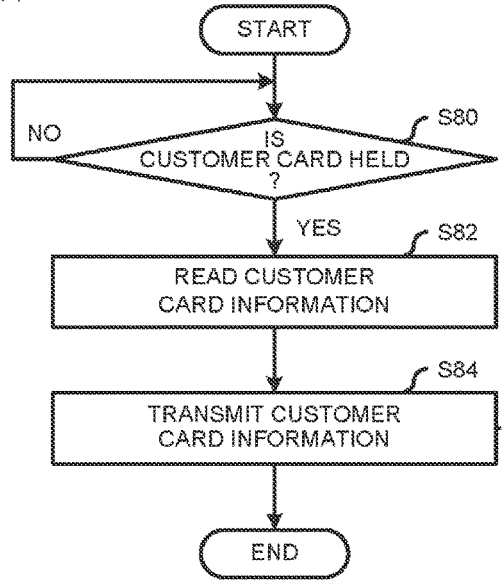
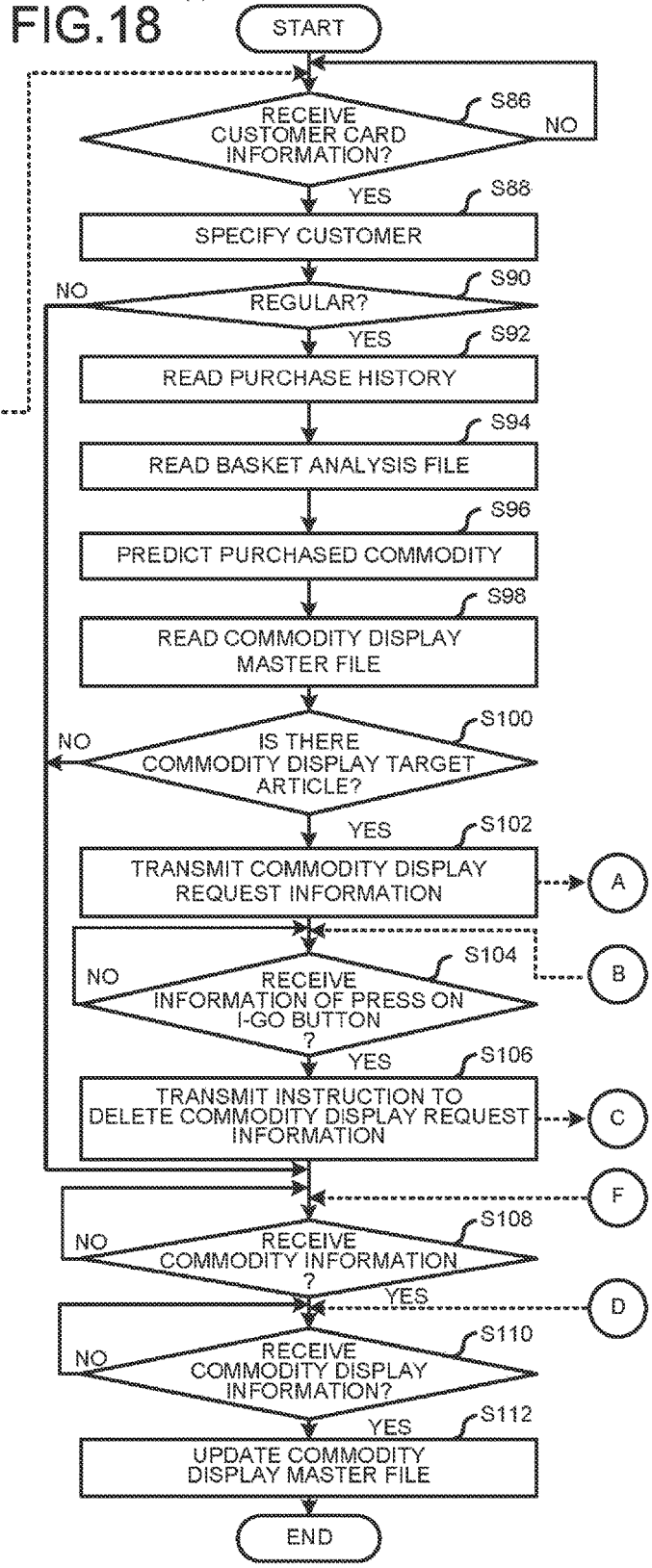
FIG. 18

INVENTORY MANAGEMENT COMPUTER SYSTEM

CROSS-REFERENCE TO RELATED APPLICATION

This application is a continuation of U.S. patent application Ser. No. 16/581,021, filed Sep. 24, 2019, which application is a continuation of U.S. patent application Ser. No. 15/875,368, filed Jan. 19, 2018, now U.S. Pat. No. 10,482,444, issued on Nov. 19, 2019, which application is based upon and claims the benefit of priority from Japanese Patent Application No. 2017-029878, filed Feb. 21, 2017, the entire contents of which are incorporated herein by reference.

FIELD

Embodiments described herein relate generally to an inventory management computer system.

BACKGROUND

In a retail store such as a supermarket, when a regular customer enters a store, there is a case in which a commodity that the regular customer often purchases is in stock, but the commodity is not displayed on a commodity shelf, a sales opportunity is lost.

Conventionally, such commodity display management is performed based on commodity sales data, commodity replenishment data and commodity discard data. Since a commodity preferred by the customer who enters the retail store is not preferentially displayed on the commodity shelf, if a different commodity that is likely to be purchased by the customer who enters the retail store is not displayed, the different commodity cannot be timely displayed on the commodity shelf.

DESCRIPTION OF THE DRAWINGS

FIG. 7 is a diagram illustrating an example of the data structure stored in a customer master file;

FIG. 8 is a diagram illustrating an example of the data structure stored in a commodity display master file;

FIG. 9 is a diagram illustrating an example of a notification screen displayed on the portable terminal;

FIG. 10 is a flowchart illustrating the flow of processing executed by the customer detection apparatus and the flow of a series of processing executed by the store server when a customer enters a store;

FIG. 18 is a flowchart illustrating the flow processing executed by a customer detection apparatus and a store server according to the second embodiment;

DETAILED DESCRIPTION

In accordance with an embodiment, a computer system includes an inventory management server, a plurality of point-of-sale (POS) terminals communicating with the inventory management server over a first network, a face recognition computer having a camera communicating with the inventory management server over the first network, and a portable terminal communicating wirelessly with the inventory management server over a second network. The inventory management server is configured to generates alerts that are displayed on the portable terminal based on first data from the POS terminals and second data from the face recognition computer.

First Embodiment

Figure 1:
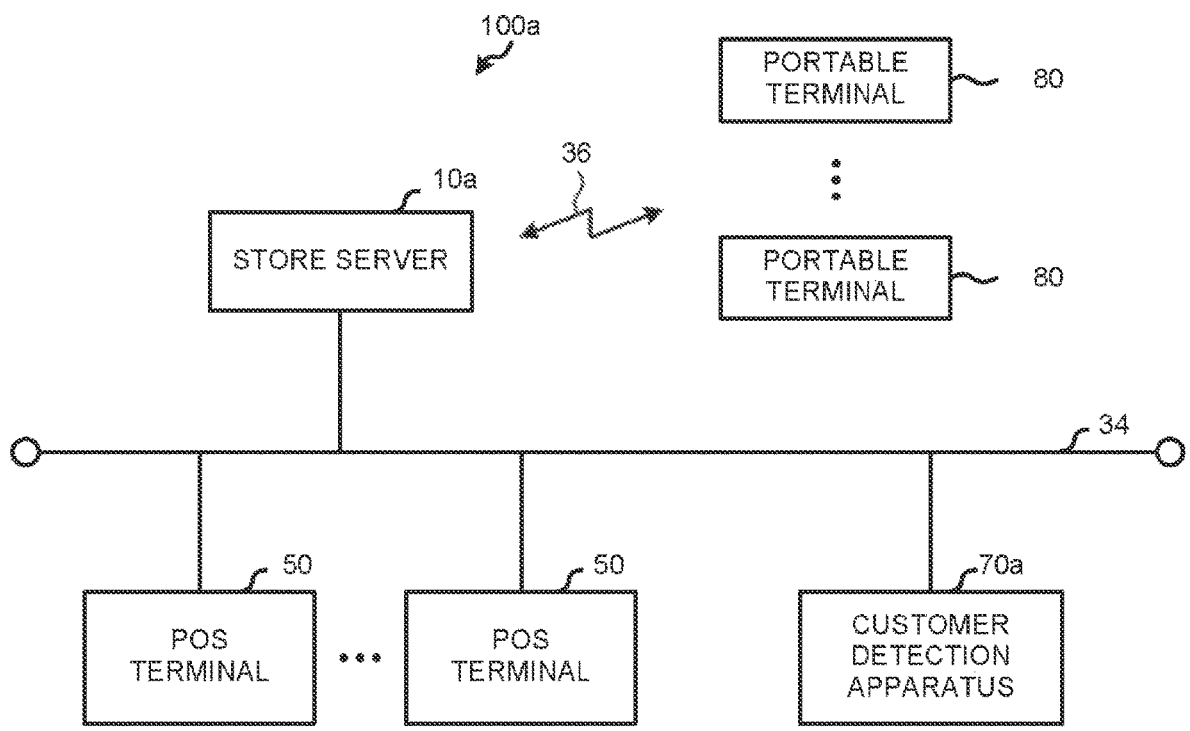
FIG. 1 is a diagram of a commodity display management system according to a first embodiment.

A commodity display management system 100a provided with a store server 10a which is an example of an information processing apparatus according to the first embodiment of the present invention is described with reference to the accompanying drawings. FIG. 1 is a system constitution diagram of the commodity display management system 100a installed in a retail store. The commodity display management system 100a predicts a commodity a customer purchases based on an attribute of the customer who enters the retail store. Then, the commodity display management system 100a requests a store clerk who performs the commodity display to replenish the commodity on condition that a display quantity of the predicted commodities is less than a predetermined value. The commodity display management system 100a is a commodity replenishment support system. As shown in FIG. 1, the commodity display management system 100a includes a store server 10a, a POS terminal (Point Of Sales) 50, a customer detection apparatus 70a, and a portable terminal 80.

The store server 10a manages commodity information, customer information, and commodity display information for the retail store. The store server 10a extracts the attributes of a customer C who enters the retail store. The store server 10a then predicts the commodity that the customer C is likely to purchase based on the attribute of the customer C. Further, the store server 10a requests for the store clerk who performs the commodity display to replenish the commodity, when the display quantity of the predicted commodities is less than the predetermined value.

A plurality of POS terminals 50 is installed in the retail store. The POS terminal 50 executes a commodity registration processing and a checkout processing of a commodity purchased by the customer C.

The customer detection apparatus 70a is installed at an entrance of the retail store, and captures an image of a face of the customer C who visits the retail store. The store server 10a, the POS terminal 50, and the customer detection apparatus 70a communicate with one another by a communication network 34 such as a LAN (Local Area Network).

The portable terminal 80 is held by each of a plurality of store clerks who perform the commodity display work in the retail store. Based on an instruction from the store server 10a, the portable terminal 80 communicates to the store clerk the commodity information necessary for the commodities to be displayed. The store server 10a and the portable terminal 80 communicate with each other via a wireless communication 36 such as a wireless LAN.

Description of Hardware Structure of Store Server

Figure 2:
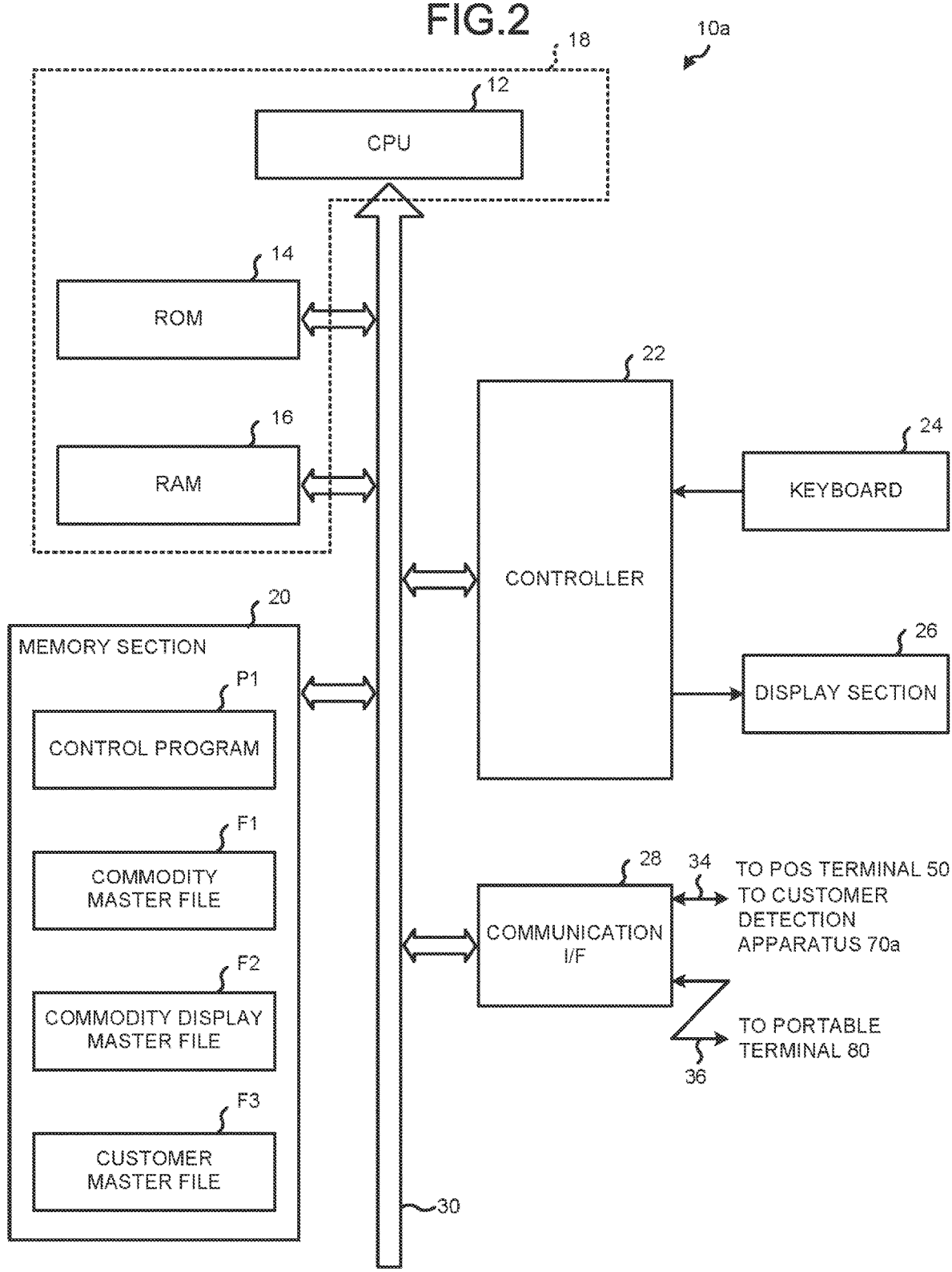
FIG. 2 is a block diagram illustrating the hardware configuration of a store server.

FIG. 2 is a block diagram illustrating the hardware configuration of the store server 10a.

As shown in FIG. 2, the store server 10a is installed in a back office of a retail store, and includes a control section 18 having a computer that includes a CPU (Central Processing Unit) 12, a ROM (Read Only Memory) 14, a RAM (Random Access Memory) 16. The CPU 12 executes various processing to control each section. The ROM 14 stores data in a non-volatile manner. The RAM 16 stores various data in a rewritable manner and is used as a work area. The CPU 12, the ROM 14 and the RAM 16 are connected via an internal bus line 30.

Further, a keyboard 24 and a display section 26 as peripheral devices are connected to the store server 10a via a controller 22. The operations of both peripheral devices are all controlled by the control section 18. The keyboard 24 receives an input of an operation instruction to the store server 10a. The display section 26 displays information output by the store server 10a.

Furthermore, the store server 10a is provided with a communication interface (I/F) 28 for executing data communication with the POS terminal 50 and the customer detection apparatus 70a via the communication network 34 provided in the retail store. The communication I/F 28 performs mutual communication between the store server 10a and the portable terminal 80 through the wireless communication 36. The communication I/F 28 is also connected to the internal bus line 30.

A memory section 20, which is a storage device, is connected to the control section 18 via the internal bus line 30. The memory section 20 is, for example, a HDD (Hard Disc Drive), a flash memory and the like, and stores the stored content even if the power is cut off.

The memory section 20 stores an operating system, a control program P1 such as various computer programs and various master data such as a commodity master file F1, a commodity display master file F2, and a customer master file F3.

The control program P1 executed by the store server 10a may be provided as a file in an installable format or an executable format in a computer-readable recording medium such as a CD-ROM, a FD (Flexible Disk), a CD-R, a DVD (Digital Versatile Disc) and the like.

The control program P1 executed by the store server 10a may be stored on a computer connected to a network such as an Internet, and be provided by being downloaded via the network. Further, the control program P1 executed by the store server 10a may be provided or distributed via a network such as the Internet. The control program P1 executed by the store server 10a may be provided by being incorporated in the ROM 14 in advance.

The commodity master file F1 is a master file in which the commodity information of all commodities handled at the retail store is registered. The commodity information includes information such as a commodity code, a commodity category, a commodity name, a unit price, etc. The commodity display master file F2 is a master file in which commodity display status and inventory status in the retail store are registered. The commodity display master file F2 includes information such as a commodity code, a commodity name, an inventory quantity (display quantity) on a commodity shelf, an inventory quantity in the back office, etc. The customer master file F3 is a master file in which the customer information is registered. The customer master file F3 includes a customer code, a customer name, a feature value for identifying a facial image of the customer, information indicating whether the customer is a regular customer, information such as a purchase history of the customer and the like as the customer information. The customer master file F3 is described in detail later.

Description of Hardware Structure of POS Terminal

Figure 3:
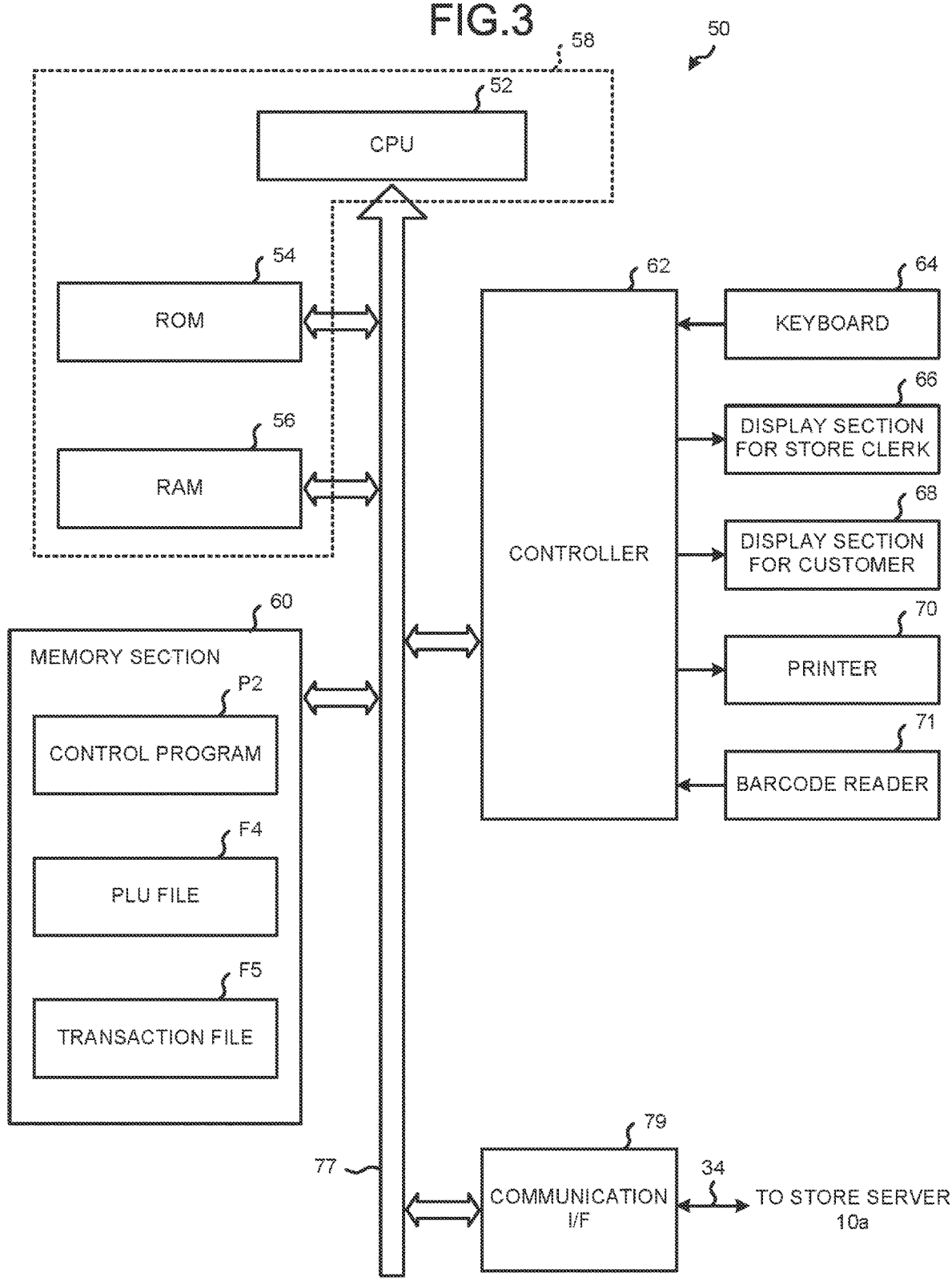
FIG. 3 is a block diagram illustrating the hardware configuration of a POS terminal.

FIG. 3 is a block diagram illustrating the hardware configuration of the POS terminal 50. As shown in FIG. 3, the POS terminal 50 includes a control section 58 having a computer including a CPU 52, a ROM 54 and a RAM 56. The CPU 52 executes various processing to control each section. The ROM 54 stores data in an non-volatile manner. The RAM 56 stores various data in a rewritable manner and is used as a work area. The CPU 52, the ROM 54 and the RAM 56 are connected via an internal bus line 77.

Peripheral devices such as a keyboard 64, a display section for store clerk 66, a display section for customer 68, a printer 70, a barcode reader 71 and the like are connected to the POS terminal 50 via a controller 62. The operations of these peripheral devices are all controlled by the control section 58.

The keyboard 64 includes various keys such as, for example, a numeric key for entering a commodity code and an amount of money, a subtotal key for declaring calculation of a sales total amount, a cash total key for declaring settlement by cash in a sales processing, a PLU (Price Look-Up) key for designating various commodities, a confirmation key for confirming a numeric input by the numeric keys, a clear key, and the like.

Further, the POS terminal 50 is provided with a communication I/F 79 for executing data communication with the store server 10a, which is a host device, via the communication network 34 installed in the retail store. The communication I/F 79 is connected to the internal bus line 77.

A memory section 60 which is a storage device is connected to the control section 58 via the internal bus line 77. The memory section 60 is a HDD, a flash memory, or the like, and stores the stored contents even if the power is cut off.

The memory section 60 stores an operating system, a control program P2 such as various computer programs, and various data such as a PLU file F4 and a transaction file F5.

The control program P2 executed by the POS terminal 50 may be provided as a file in an installable format or an executable format in a computer-readable recording medium such as a CD-ROM, a FD (Flexible Disk), a CD-R, a DVD (Digital Versatile Disc) and the like.

The control program P2 executed by the POS terminal 50 may be stored on a computer connected to a network such as an Internet, and be provided by being downloaded via the network. Further, the control program P2 executed by the POS terminal 50 may be provided or distributed via a network such as the Internet. The control program P2 executed by the POS terminal 50 may be provided by being incorporated in the ROM 54 in advance.

The PLU file F4 is a file in which a commodity code and a unit price for uniquely identifying each commodity are registered. The PLU file F4 is a file in which information for registering the commodity purchased by the customer, retrieved from the commodity master file F1 described above. The transaction file F5 is a file in which the transaction history in the POS terminal 50 is recorded. The transaction file F5 includes information such as a purchaser, a commodity name, a quantity, a sales date and time, and the like.

Description of Hardware Structure of Customer Detection Apparatus

Figure 4:
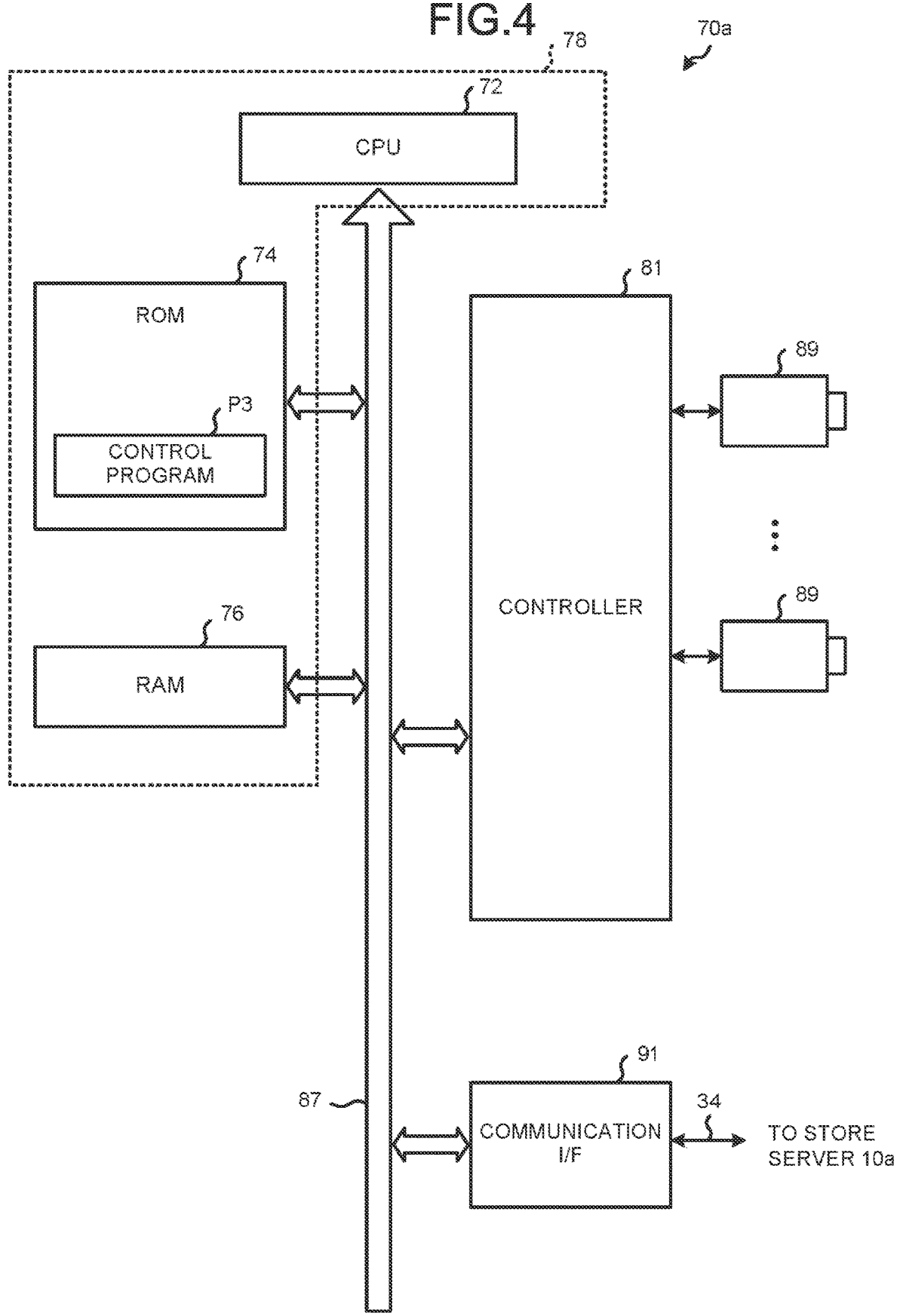
FIG. 4 is a block diagram illustrating the hardware configuration of a customer detection apparatus.

FIG. 4 is a block diagram illustrating the hardware configuration of the customer detection apparatus 70a. As shown in FIG. 4, the customer detection apparatus 70a includes a control section 78 having a computer including a CPU 72, a ROM 74 and a RAM 76. The CPU 72 executes various processing to control each section. The ROM 74 stores data in a non-volatile manner. The RAM 76 stores variable data in a rewritable manner and is used as a work area. The CPU 72, the ROM 74, and the RAM 76 are connected via an internal bus line 87.

A control program P3 executed by the customer detection apparatus 70a is stored in the ROM 74. The control program P3 may be provided as a file in an installable format or an executable format in a computer-readable recording medium such as a CD-ROM, a FD (Flexible Disk), a CD-R, a DVD (Digital Versatile Disc) and the like.

A plurality of cameras 89 are connected to the customer detection apparatus 70a via a controller 81. Each of the cameras 89 has the same general configuration and captures an image including a face of the customer C in the retail store. The operation of the camera 89 is controlled by the control section 78.

Furthermore, the customer detection apparatus 70a is provided with a communication I/F 91 for executing data communication with the store server 10a, which is a host device, via the communication network 34 provided in the retail store. The communication I/F 91 is connected to the internal bus line 87.

Description of Hardware Structure of Portable Terminal

Figure 5:
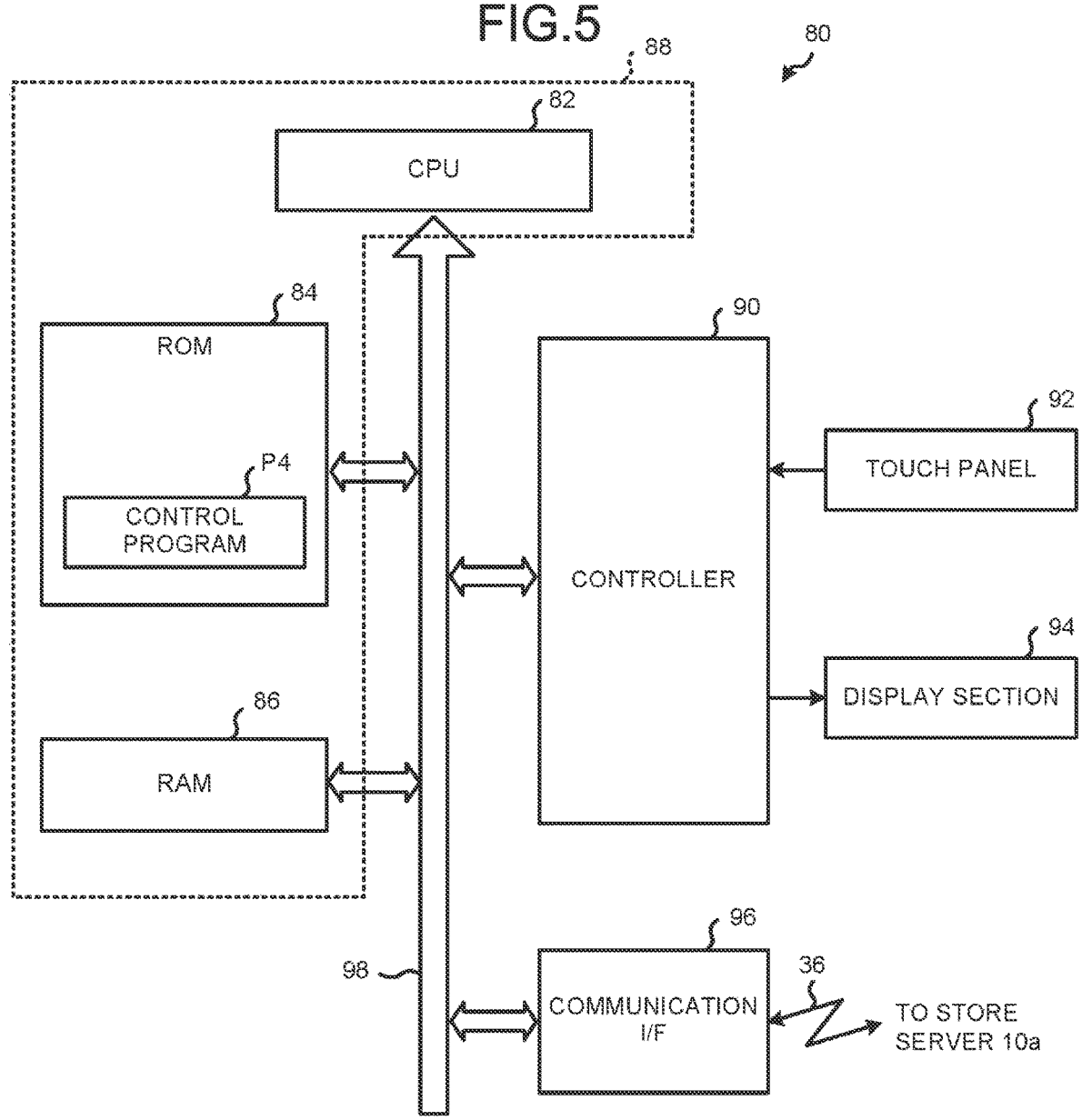
FIG. 5 is a block diagram illustrating the hardware configuration of a portable terminal.

FIG. 5 is a block diagram illustrating the hardware configuration of the portable terminal 80. As shown in FIG. 5, the portable terminal 80 includes a control section 88 having a computer constitution including a CPU 82, a ROM 84, a RAM 86, and the like. The CPU 82 executes various processing to control each section. The ROM 84 stores data in a non-volatile manner. The RAM 86 stores variable data in a rewritable manner and is used as a work area. The CPU 82, the ROM 84, and the RAM 86 are connected via an internal bus line 98.

A control program P4 executed by the portable terminal 80 is stored in the ROM 84.

A display section 94 and a touch panel 92 are connected to the portable terminal 80 via a controller 90. The display section 94 displays information output by the portable terminal 80. The touch panel 92 receives an input of an operation instruction to the portable terminal 80. The operations of both peripheral devices are controlled by the control section 88.

Further, the portable terminal 80 is provided with a communication I/F 96 for executing data communication with the store server 10a via the wireless communication 36. The communication I/F 96 is also connected to the internal bus line 98.

Description of Functional Component of Commodity Display Management System

Figure 6:
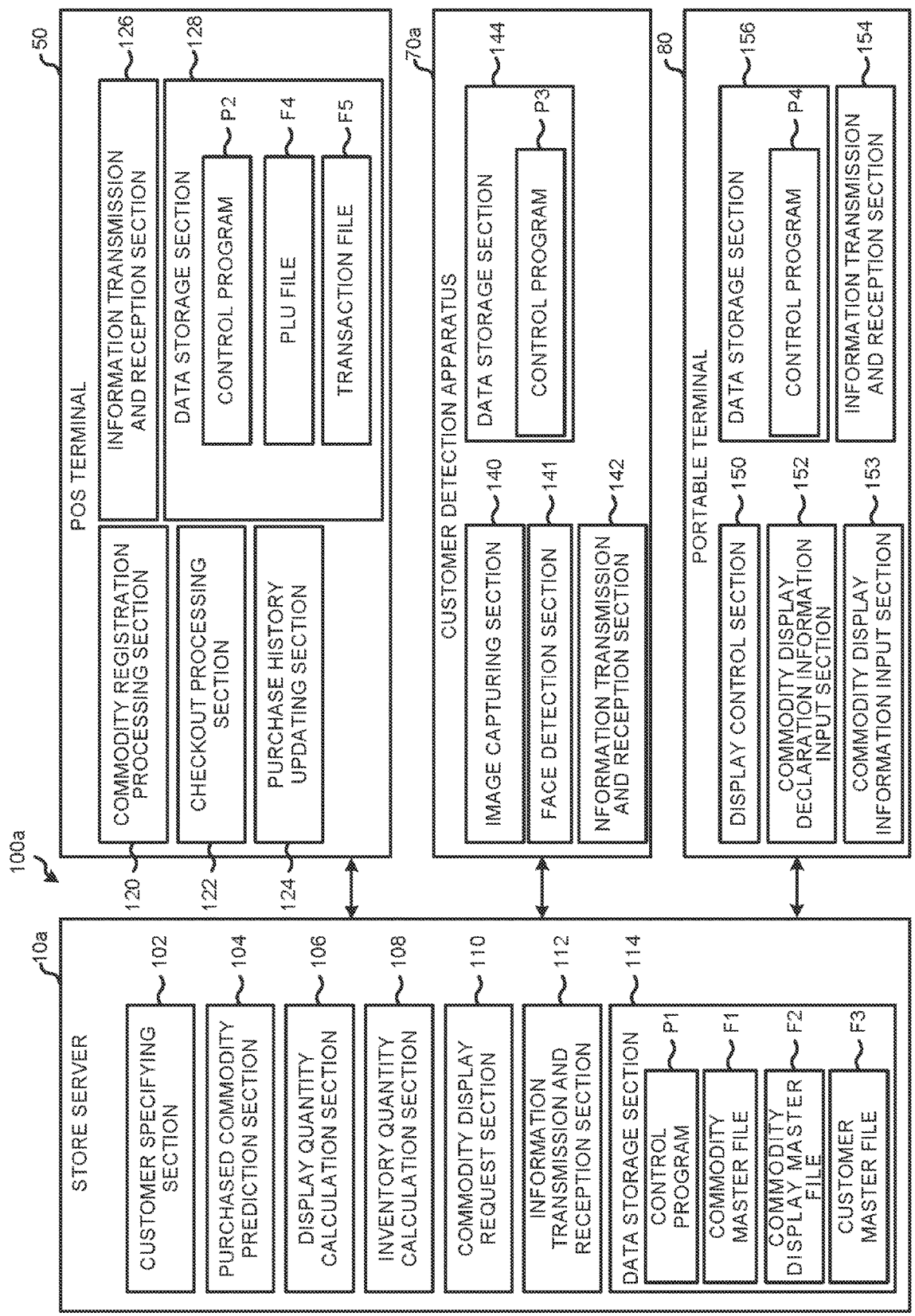
FIG. 6 is a functional block diagram illustrating the functional components of the commodity display management system.

Next, the functional components of the commodity display management system 100a are described with reference to FIG. 6. FIG. 6 is a block diagram illustrating the functional components of the commodity display management system 100a.

As shown in FIG. 6, the commodity display management system 100a includes the store server 10a, the POS terminal 50, the customer detection apparatus 70a, and the portable terminal 80. Although a plurality of POS terminals 50 and a plurality of the portable terminals 80 are provided, here, in order to simplify the description, the commodity display management system 100a is illustrated with one POS terminal 50 and one portable terminal 80, respectively.

The CPU 12 (FIG. 2) of the store server 10a operates according to the control program P1 to realize a customer identifying section 102, a purchased commodity prediction section 104, a display quantity calculation section 106, an inventory quantity calculation section 108, a commodity display request section 110, an information transmission and reception section 112 and a data storage section 114 shown in FIG. 6 as functional sections inside the control section 18.

The customer identifying section 102 is an example of a identifying module. The customer identifying section 102 compares a feature value extracted from the facial image of the customer C captured by the customer detection apparatus 70a with a feature value registered in the customer master file F3 mentioned above to identify the customer C who enters the retail store.

The purchased commodity prediction section 104 is an example of a prediction module. The purchased commodity prediction section 104 predicts a commodity that the customer C is likely to purchase based on a result of identifying the customer C. Specifically, the purchased commodity prediction section 104 predicts a commodity that is likely to be purchased based on a past purchase history of the customer C.

The display quantity calculation section 106 is an example of a calculation module. The display quantity calculation section 106 calculates how many of the commodities predicted by the purchased commodity prediction section 104 are currently displayed on the commodity shelf of the retail store. Specifically, the display quantity calculation section 106 refers to the commodity display master file F2 to obtain a display quantity of the corresponding commodities at the time of opening the store. The display quantity calculation section 106 then calculates the current display quantity by subtracting the number of commodities subjected to a checkout processing in the POS terminal 50 from the obtained display quantity.

The inventory quantity calculation section 108 calculates the current inventory quantity (inventory quantity stored in the back office of the retail store) of the commodities predicted by the purchased commodity prediction section 104. Specifically, the inventory quantity calculation section 108 refers to the commodity display master file F2 to obtain a total inventory quantity of the corresponding commodities at the time of opening the store. The inventory quantity calculation section 108 then calculates the current inventory quantity by subtracting the number of commodities displayed on the commodity shelf up to now from the total inventory quantity at the time of opening the store.

The commodity display request section 110 is an example of a request module. When the display quantity of a commodity predicted by the purchased commodity prediction section 104 is less than a predetermined value and the current inventory quantity of the commodities is not 0, the commodity display request section 110 transmits the commodity display request information requesting the commodity display of the corresponding commodity to the portable terminal 80 carried by the store clerk.

The information transmission and reception section 112 transmits and receives information between the store server 10a and the POS terminal 50. The information transmission and reception section 112 transmits and receives information between the store server 10a and the customer detection apparatus 70a. Further, the information transmission and reception section 112 transmits and receives information between the store server 10a and the portable terminal 80. The information transmitted and received is described in detail with reference to the flowcharts in FIG. 10, FIG. 11 and FIG. 12 described later.

The data storage section 114 is realized by the memory section 20 (FIG. 2) described above. The data storage section 114 stores the control program P1, the commodity master file F1, the commodity display master file F2, and the customer master file F3 described above. The content of each master file is described later.

The CPU 52 (FIG. 3) of the POS terminal 50 operates according to the control program P2 to realize a commodity registration processing section 120, a checkout processing section 122, a purchase history updating section 124, an information transmission and reception section 126, and a data storage section 128 shown in FIG. 6 as the functional sections inside the control section 58. Although not shown in FIG. 6, all POS terminals 50 have the same functional components.

The commodity registration processing section 120 reads a commodity code of a commodity from a barcode on the commodity purchased by the customer C. The commodity registration processing section 120 performs a commodity registration processing of registering the commodity based on the read commodity code.

The checkout processing section 122 executes a checkout processing for settling a transaction with respect to the commodity after the commodity registration processing section 120 registers the commodity codes of all the commodities purchased by the customer C.

The purchase history updating section 124 stores the commodity information purchased by the customer C in the transaction file F5 after the checkout processing is completed. As a result, the purchase history of the customer C is generated.

The information transmission and reception section 126 transmits and receives information between the POS terminal 50 and the store server 10a. Specifically, the transaction file F5 is transmitted from the POS terminal 50 to the store server 10a. Details are described with reference to the flowchart in FIG. 12 described later.

The data storage section 128 is realized by the memory section 60 (FIG. 3) described above. The data storage section 128 stores the control program P2, the PLU file F4, and the transaction file F5 described above. The content of each file is described later.

The CPU 72 (FIG. 4) of the customer detection apparatus 70a operates according to the control program P3 to realize an image capturing section 140, a face detection section 141, an information transmission and reception section 142 and a data storage section 144 shown in FIG. 6 as the functional sections inside the control section 78.

The image capturing section 140 captures an image including the face of the customer C by the camera 89 (89a, . . . , 89k).

The face detection section 141 performs a face detection processing for detecting a face from the image captured by the image capturing section 140.

The information transmission and reception section 142 transmits and receives information between the customer detection apparatus 70a and the store server 10a. Specifically, a category of the feature value and the magnitude of the feature value extracted from the face detection section 141 are transmitted from the customer detection apparatus 70a to the store server 10a. Details are described with reference to the flowchart in FIG. 10 described later.

The data storage section 144 is realized by the ROM 74 (FIG. 4) described above. The data storage section 144 stores the control program P3.

The CPU 82 (FIG. 5) of the portable terminal 80 operates according to the control program P4 to realize a display control section 150, a commodity display declaration information input section 152, a commodity display information input section 153, an information transmission and reception section 154, and a data storage section 156 shown in FIG. 6 as the functional sections inside the control section 88. Although not shown in FIG. 6, all the portable terminals 80 have the same functional components.

The display control section 150 controls the information displayed on the display section 94 (FIG. 5) of the portable terminal 80. Specifically, the display control section 150 displays a notification screen 95a (see FIG. 9) including a commodity display request information on the display section 94 of the portable terminal 80. Further, the display control section 150 erases the commodity display request information displayed on the display section 94 of the portable terminal 80 other than the portable terminal 80 where an I-go button B1 (see FIG. 9) described later is pressed.

The commodity display declaration information input section 152 receives intention display of the store clerk for performing the commodity display at the time information for requesting the commodity display is displayed on the display section 94 (FIG. 5) of the portable terminal 80. Specifically, the commodity display declaration information input section 152 receives a press on the I-go button B1 (refer to FIG. 9) described later. Further, the commodity display declaration information input section 152 transmits the intention display indicating that the store clerk performs the commodity display to the store server 10*a*.

The commodity display information input section 153 receives the commodity code and the quantity (commodity display information) of the commodity, which is displayed on the commodity shelf, which are input in the portable terminal 80 if the clerk performs the commodity display.

The information transmission and reception section 154 transmits and receives information between the portable terminal 80 and the store server 10*a*. Specifically, the commodity display request information and an instruction to erase the commodity display request information are transmitted from the store server 10*a* to the portable terminal 80. Information indicating pressing of the I-go button B1 and the commodity display information are transmitted from the portable terminal 80 to the store server 10*a*. Details are described with reference to flowcharts in FIG. 10 and FIG. 11 described later.

The data storage section 156 is realized by the above-mentioned ROM 84 (FIG. 5). The data storage section 156 stores the control program P4.

The functional components shown in FIG. 6 are merely examples and are not limited to the illustrated components. For example, by storing the customer master file F3 in the data storage section 144 of the customer detection apparatus 70*a*, a change such as making the customer detection apparatus 70*a* have the function of the customer identifying section 102 may be made.

Description of Contents of Customer Master File

Next, with reference to FIG. 7, the contents of the information stored in the customer master file F3 are described. FIG. 7 is a diagram illustrating an example of the data structure stored in the customer master file F3.

The customer master file F3 has customer attribute information F3*a* and purchase history information F3*b*. As shown in FIG. 7(*a*), the customer attribute information F3*a* is a database that stores attribute information necessary for identifying the customer C. The purchase history information F3*b* is a database that stores the past purchase history of the customer C, as shown in FIG. 7(*b*).

As shown in FIG. 7(*a*), the customer attribute information F3*a* includes a serial number column f1, a customer ID column f2, a customer name column f3, a feature value type column f4, a feature value amount column f5 and a regular column f6. Although not shown in FIG. 7(*a*), the customer attribute information F3*a* may also store age, sex and the like of the customer C together.

The serial number column f1 stores data serial number. The customer ID column f2 stores an identification number assigned to each registered customer C. The customer name column f3 stores the name of each customer C.

The feature value type column f4 stores a type of the feature value contained in the facial image of the customer C, which is a feature for identifying each customer C. The feature value amount column f5 stores an amount of the feature value stored in the feature value type column f4 or a range of amounts of the feature value. The regular column f6 stores information on whether the customer C is a regular customer. For example, it is assumed that the regular customer is a customer C whose frequency of shopping at the retail store exceeds a predetermined value. Various other definitions may be considered for the regular. For example, a customer C whose past total payment amount in the retail store exceeds a predetermined value may be defined as the regular customer.

As shown in FIG. 7(*b*), the purchase history information F3*b* includes a customer ID column f7, a commodity ID column f8, a commodity name column f9, a quantity column f10, and a purchase date column f11.

The customer ID column f7 stores the identification number assigned to each customer C. The commodity ID column f8 stores the commodity code purchased by the customer C. The commodity name column f9 stores the commodity name purchased by the customer C.

The quantity column f10 stores the quantity of commodities purchased by the customer C. The purchase date column f11 stores the date at which the customer C purchases the commodity.

Both the customer attribute information F3*a* and the purchase history information F3*b* included by the customer master file F3 have a so-called relational database structure. In other words, the information registered in the customer attribute information F3*a* and the information registered in the purchase history information F3*b* are associated with each other. Therefore, by performing information search on the information stored in the customer master file F3, it is possible to easily extract various information on a specific customer C. For example, it is possible to easily perform a search operation such as "sort commodities purchased by a customer over the past year in order of purchase frequency".

Description of Contents of Commodity Display Master File

Next, the content of information stored in the commodity display master file F2 is described with reference to FIG. 8. FIG. 8 is a diagram illustrating an example of the data structure stored in the commodity display master file F2.

The commodity display master file F2 is a database in which the inventory quantity of each commodity in the retail store is registered. As shown in FIG. 8, the commodity display master file F2 includes a commodity ID column f20, a commodity name column f21, a display quantity column f22, a back office inventory quantity column f23, and a commodity display object column f24.

The commodity ID column f20 stores the commodity code of each commodity. The commodity name column f21 stores the commodity name.

The display quantity column f22 stores the number of commodities (display number) displayed on the commodity shelf. The back office inventory quantity column f23 stores the number of commodities placed in the back office. The commodity display object column f24 stores information indicating whether it is a commodity required to be displayed on the commodity shelf. The display quantity column f22 and a numerical value stored in the back office inventory quantity column f23 are updated as appropriate. Specifically, the numerical value of the display quantity column f22 is updated by reading a sales number of commodities every time the store server 10*a* receives the transaction file F5 updated each time the checkout processing is completed from the POS terminal 50. The numerical value of the back office inventory quantity column f23 is updated every time the store server 10*a* receives the commodity code and the quantity of the commodities to be displayed on the commodity shelf which are input to the portable terminal 80 by the store clerk who performs the commodity display.

For the commodity required to be displayed on the commodity shelf, a check mark Cm is drawn in a check box C drawn in the commodity display object column f24 (for example, commodity A and commodity B in FIG. 8). On the other hand, for the commodity that is not required to be displayed on the commodity shelf, only the check box C which is empty is drawn in the commodity display object column f24 (for example, commodity C in FIG. 8).

Whether the commodity display is necessary is determined based on the numerical value stored in the display quantity column f22. If the numerical value stored in the display quantity column f22 is less than a predetermined value (e.g., less than 15), a check mark Cm is drawn in the check box C in the commodity display object column f24. On the other hand, if the numerical value stored in the display quantity column f22 is greater than or equal to the predetermined value, the check box C is empty in the commodity display object column f24.

Description of Commodity Display Request Information

Next, with reference to FIG. 9, if the commodity display is required, the commodity display request information sent to the portable terminal 80 carried by the store clerk who performs the commodity display is described. FIG. 9 is a diagram illustrating an example of the notification screen 95a displayed on the portable terminal 80 in the present embodiment.

The display control section 150 (FIG. 6) of the portable terminal 80 receives an instruction from the commodity display request section 110 (FIG. 6) of the store server 10a, and the notification screen 95a shown in FIG. 9 is displayed on the display section 94 (touch panel 92) of the portable terminal 80.

The notification screen 95a displays the commodity display request information. The commodity display request information includes a visit guidance M1, a visiting customer name M2, a commodity list F2a, and the I-go button B1 which is an example of an operator.

The visit guidance M1 informs that the regular customer enters the retail store. The visiting customer name M2 is a name of the customer C who enters the retail store.

The commodity list F2a is a commodity list that the customer C is likely to purchase based on the past purchase history of the customer C selected from the commodity display master file F2. The commodity list F2a has the same format as the commodity display master file F2. The commodity list F2a in FIG. 9 has the same content as the commodity display master file F2 in FIG. 8. However, a commodity list F2a is selected from the commodity display master file F2 in response to the customer C, and the commodity list F2a is displayed on the notification screen 95a.

The I-go button B1 is an operator for receiving the intention display from the store clerk to perform the commodity display for the commodity indicated as the commodity display object in the commodity list F2a. Specifically, the store clerk first selects the commodity to be displayed on the commodity shelf by pressing a commodity selection button B2 or a commodity selection button B3. Next, the store clerk presses the I-go button B1 to declare that the commodity display of the commodities selected by the commodity selection buttons B2 and B3 is performed.

Description of Flow of Processing Executed by Customer Detection Apparatus and Store Server Next, the flow of a series of processing executed by the customer detection apparatus 70a and the store server 10a is described with reference to the flowchart in FIG. 10. The flowchart shown in FIG. 10 illustrates the flow of processing executed by the customer detection apparatus 70a and the flow of a series of processing executed by the store server 10a when the customer enters the retail store.

First, with reference to the flowchart in FIG. 10(a), the flow of processing executed by the customer detection apparatus 70a is described. The image capturing section 140 performs the image capturing processing (Act S10). There is no limitation on the execution timing of the image capturing processing, and the image capturing may be performed if an instruction is given by the control program P3.

The face detection section 141 performs the face detection processing for detecting a face from images captured by the image capturing section 140 (Act S12).

The face detection section 141 determines whether a face is detected (Act S14). If the face is detected (Yes in Act S14), the flow proceeds to the processing in Act S16. On the other hand, if no face is detected (No in Act S14), the flow returns to the processing in Act S10.

Subsequently, the face detection section 141 extracts the feature value from the detected face (Act S16). The feature value detected here is the feature value characterizing each customer stored in the customer attribute information F3a of the customer master file F3 stored by the store server 10a. The face detection section 141 receives each type of the feature value stored in the customer attribute information F3a via the information transmission and reception section 112 of the store server 10a and the information transmission and reception section 142 of the customer detection apparatus 70a.

The information transmission and reception section 142 transmits the type of the extracted feature value and the amount of the feature value to the store server 10a (Act S18). After that, the customer detection apparatus 70a ends the processing in FIG. 10(a). Actually, until the operation of the commodity display management system 100a stops, the customer detection apparatus 70a repeats the processing in FIG. 10(a).

Next, with reference to the flowchart in FIG. 10(b), the flow of the processing executed by the store server 10a when the customer enters the retail store is described. The information transmission and reception section 112 determines whether the feature value is received from the customer detection apparatus 70a (Act S20). In a case in which the feature value is received (Yes in Act S20), the customer identifying section 102 compares the type and the amount of the received feature value with those in the feature value type column f4 and the feature value amount column f5 (FIG. 7) of the customer attribute information F3a to identify the customer C (Act S22). On the other hand, in Act S20, if the information transmission and reception section 112 does not receive the feature value from the customer detection apparatus 70a (No in Act S20), the processing in Act S20 is repeated.

Based on the identifying result in Act S22, the customer identifying section 102 determines whether the customer C is the regular customer (Act S24). If it is determined that the customer C is the regular customer (Yes in Act S24), the flow proceeds to the processing in Act S26.

Next, the purchased commodity prediction section 104 reads the purchase history information F3b of the customer C (Act S26).

Based on the purchase history information F3b of the customer C, the purchased commodity prediction section 104 predicts, for example, the top three commodities that the customer C is likely to purchase (Act S28).

Subsequently, the commodity display request section 110 reads the information in the commodity display master file F2 (Act S30).

The commodity display request section 110 refers to the commodity display object column f24 of the read commodity display master file F2 to determine whether the commodity display target article exists in the commodities that the customer C is likely to purchase (Act S32). If there is a commodity display target article (Yes in Act S32), the flow proceeds to the processing in Act S34.

The commodity display request section 110 transmits the commodity display request information to the portable terminal 80 (Act S34).

The commodity display request section 110 determines whether the information indicating that the I-go button B1 (FIG. 9) is pressed is received from the portable terminal 80 via the information transmission and reception section 112 (Act S36). If the information indicating that the I-go button B1 is pressed is received (Yes in Act S36), the flow proceeds to the processing in Act S38. On the other hand, if the information indicating that the I-go button B1 is pressed is not received (No in Act S36), the processing in Act S36 is repeated.

The commodity display request section 110 transmits a signal instructing the deletion of the commodity display request information to all the portable terminals 80 other than the portable terminal which transmits information indicating that the I-go button B1 is pressed among the portable terminals 80 (Act S38).

Next, the inventory quantity calculation section 108 determines whether the commodity display information is received from the portable terminal 80 (Act S40). If the commodity display information is received (Yes in Act S40), the flow proceeds to the processing in Act S42. On the other hand, if the commodity display information is not received (No in Act 40), the processing in Act 40 is repeated.

The display quantity calculation section 106 and the inventory quantity calculation section 108 update the information in the commodity display master file F2 (Act S42). Specifically, the display quantity calculation section 106 updates the display quantity column f22 of the commodity display master file F2 based on the contents of the transaction file F5. The inventory quantity calculation section 108 updates the back office inventory quantity column f23 of the commodity display master file F2 based on the received commodity display information. Thereafter, the store server 10a ends the processing in FIG. 10(b). Actually, until the commodity display management system 100a stops the operation, the store server 10a repeats the processing in FIG. 10(b).

In Act S24, if it is determined that the customer C is not the regular customer (No in Act S24), and in Act S32, if the commodity display of the commodity that the customer C is likely to purchase is unnecessary (No in Act S32), the flow proceeds to the processing in Act S40 in both cases.

Description of Flow of Processing Executed by Portable Terminal

Next, the flow of a series of processing executed by the portable terminal 80 is described with reference to the flowchart in FIG. 11.

The information transmission and reception section 154 determines whether the commodity display request information is received from the store server 10a (Act S50). If the commodity display request information is received (Yes in Act S50), the flow proceeds to the processing in Act S52. On the other hand, if the commodity display request information is not received (No in Act S50), the processing in Act S50 is repeated.

The display control section 150 displays the notification screen 95a (FIG. 9) on the display section 94 (touch panel 92) (Act S52).

The commodity display declaration information input section 152 determines whether or not the I-go button B1 is pressed (Act S54). If the I-go button B1 is pressed (Yes in Act S54), the flow proceeds to the processing in Act S56. On the other hand, if the I-go button B1 is not pressed (No in Act S54), the flow proceeds to the processing in Act S58.

The commodity display declaration information input section 152 transmits information indicating that the I-go button B1 is pressed to the store server 10a via the information transmission and reception section 154 (Act S56).

The display control section 150 determines whether the signal instructing the deletion of the commodity display request information is received from the store server 10a (Act S58). If the signal instructing the deletion of the commodity display request information is received (Yes in Act S58), the flow proceeds to the processing in Act S60. On the other hand, if the signal instructing deletion of the commodity display request information is not received (No in Act S58), the flow proceeds to the processing in Act S54.

The display control section 150 erases the commodity display request information (Act S60). In particular, the display control section 150 erases the notification screen 95a (FIG. 9) including the commodity display request information. If the store clerk declares the commodity display of only a part of the commodities required to be displayed on the commodity shelf, the display control section 150 erases only the information corresponding to the commodities of which the commodity display is declared.

The commodity display information input section 153 determines whether the store clerk who performs the commodity display inputs the commodity display information (the commodity code and the quantity of the commodities to be displayed on the commodity shelf) to the portable terminal (Act S62). If the commodity display information is input (Yes in Act S62), the flow proceeds to the processing in Act S64. Otherwise (No in Act S62), the processing in Act S62 is repeated.

The information transmission and reception section 154 transmits the commodity display information to the store server 10a (Act S64). Thereafter, the portable terminal 80 ends the processing in FIG. 11. Actually, the portable terminal 80 repeats the processing in FIG. 11 until the operation of the commodity display management system 100a is stopped.

Figure 12:
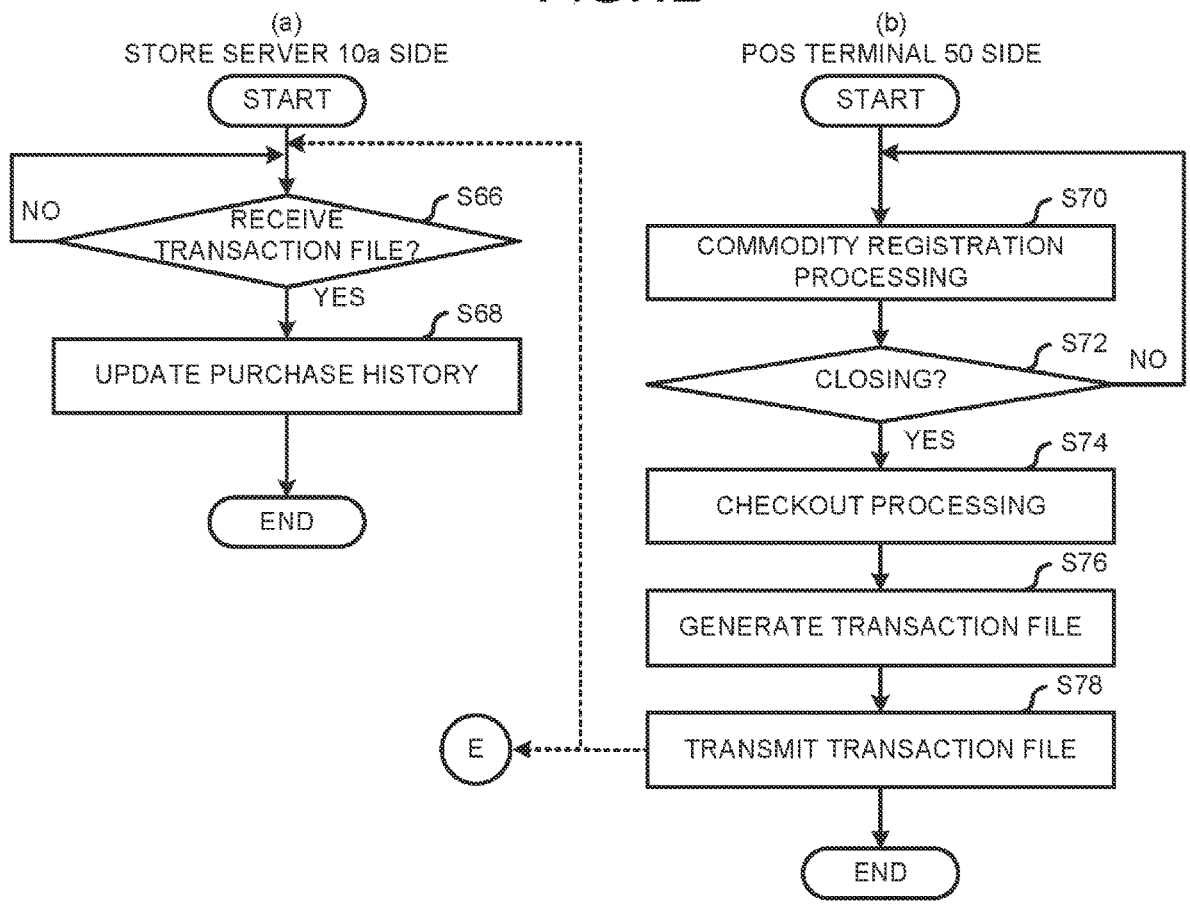
FIG. 12 is a flowchart illustrating the flow of processing executed by the POS terminal and the flow of a series of processing executed by the store server at a predetermined time such as after closing a store.

Description of Flow of Processing Executed by POS Terminal and Flow of Processing Executed by Store Server at a Predetermined Time After Closing Store Next, with reference to the flowchart in FIG. 12, the flow of a series of processing executed by the POS terminal 50 and a flow of a series of processing executed by the store server 10a at a predetermined time such as after closing the retail store are described.

First, with reference to the flowchart in FIG. 12(a), the flow of processing executed by the store server 10a is described. At a predetermined time such as after closing the retail store, the display quantity calculation section 106 determines whether the transaction file F5 is received from the POS terminal 50 (Act S66). If the transaction file F5 is received (Yes in Act S66), the flow proceeds to the processing in Act S68. On the other hand, if the transaction file F5 is not received (No in Act S66), the processing in Act S66 is repeated.

The control section 18 of the store server 10a updates the purchase history information F3b of the corresponding customer C based on the content of the transaction file F5 (Act S68). Thereafter, the store server 10a ends the processing in FIG. 12(a).

Next, the flow of processing executed by the POS terminal 50 is described with reference to the flowchart in FIG. 12(b). First, the commodity registration processing section 120 reads the commodity information of the commodity purchased by customer C to register it (Act S70). Specifically, the commodity registration processing section 120 reads the barcode attached to the commodity with the barcode reader 71 (FIG. 3).

The checkout processing section 122 determines whether the closing key is pressed (Act S72). If the closing key is pressed (Yes in Act S72), the flow proceeds to the processing in Act S74. On the other hand, if the closing key is not pressed (No in Act S72), the flow returns to the processing in Act S70.

The checkout processing section 122 executes the checkout processing to settle the transaction with respect to the commodity (Act S74). Then, the purchase history updating section 124 generates the transaction file F5 including the commodity information purchased by the customer C (Act S76).

The information transmission and reception section 126 transmits the transaction file F5 to the store server 10a (Act S78). Thereafter, the POS terminal 50 terminates the processing in FIG. 12(a). Actually, until the commodity display management system 100a stops the operation, the POS terminal 50 repeats the processing in FIG. 12(a).

In the store server 10a of the first embodiment, the customer identifying section 102 (identifying module) identifies the customer C who is the regular customer entering the retail store, and the purchased commodity prediction section 104 (prediction module) predicts the commodity that the customer C is likely to purchase based on the past purchase history of the customer C. However, the commodity that the customer C who is the regular customer is likely to purchase may be predicted based on the attributes of the customer C, such as age, sex and the like or based on the purchase history of another customer having the same attribute as the customer C.

Further, in addition to the commodity display corresponding to the customer C who is the regular customer, the commodity that the customer C is likely to purchase may also be predicted based on the purchase history of another customer having the attribute corresponding to the attribute of the customer C identified by the customer identifying section 102.

As described above, according to the store server 10a (information processing apparatus) of the first embodiment, the customer identifying section 102 (identifying module) identifies the customer C who enters the retail store, and the purchased commodity prediction section 104 (prediction module) predicts the commodity that the customer C is likely to purchase based on the purchase history of the customer C himself/herself identified by the customer identifying section 102. Then, the commodity display request section 110 transmits the commodity display request information for requesting the commodity display of the commodity predicted by the purchased commodity prediction section 104 to the portable terminal 80 carried by the store clerk of the retail store on condition that the display quantity of the commodities calculated by the display quantity calculation section 106 (calculation module) is less than the predetermined value. Therefore, at the time the customer C enters the retail store, since the commodity that the customer C is likely to purchase can be preferentially displayed on the commodity shelf, it is possible to prevent the loss of the sales opportunity in advance.

According to the store server 10a, the commodity display request section 110 transmits the commodity display request information requesting the commodity display of the commodity predicted by the purchased commodity prediction section 104 (prediction module) to the portable terminal 80 carried by the store clerk of the retail store on condition that the display quantity of the commodities calculated by the display quantity calculation section 106 (calculation module) is less than the predetermined value and the inventory quantity of the commodities is not zero. Therefore, among the commodities required to be displayed on the commodity shelf, the commodity display of the commodity in stock in the retail store can be reliably requested.

Furthermore, according to the store server 10a, the display quantity calculation section 106 (calculation module) calculates the display quantity of the commodities based on the display quantity of the commodities and the sales quantity of the commodities. Therefore, the current display quantity of the commodities can be easily and reliably calculated.

According to the store server 10a, the commodity display request section 110 displays the notification screen 95a containing the commodity information indicating the commodity predicted by the purchased commodity prediction section 104 (prediction module) and the I-go button B1 which is an operator for declaring to perform the commodity display of the commodity as the request information on the portable terminal 80. Then, the commodity display request section 110 erases the display of the commodity information from the portable terminal 80 other than the portable terminal 80 on which the operator is operated on condition that the I-go button B1 is operated. Therefore, it is possible to reliably and easily prevent that a plurality of store clerks simultaneously perform the commodity display of the same commodity.

Second Embodiment

Figure 13:
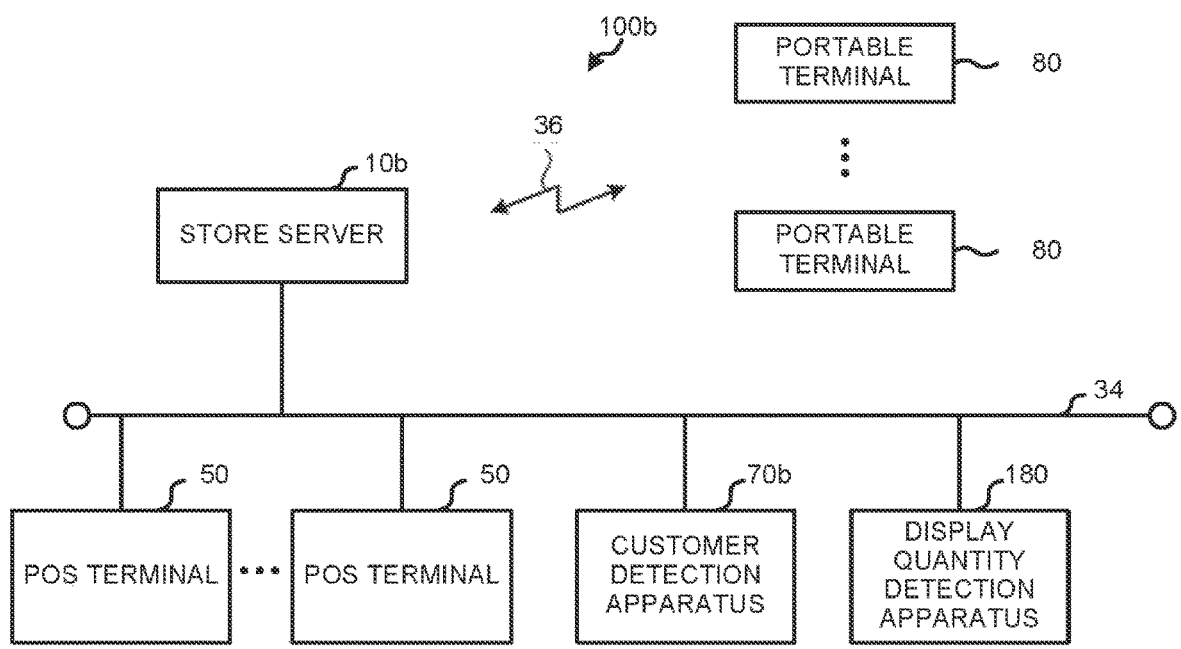
FIG. 13 is a diagram of a commodity display management system according to a second embodiment.

Next, a commodity display management system 100b provided with a store server 10b which is an example of the information processing apparatus according to the second embodiment of the present invention is described with reference to the accompanying drawings. FIG. 13 is a diagram of the commodity display management system 100b installed in the retail store.

The commodity display management system 100b has the same functions as the commodity display management system 100a, but the configuration is different. The commodity display management system 100b includes the store server 10b in place of the store server 10a (FIG. 1) for the commodity display management system 100a. Instead of the customer detection apparatus 70a (FIG. 1), a customer detection apparatus 70b is provided. The commodity display management system 100b includes a display quantity detection apparatus 180.

The store server 10b has a basket analysis function that analyzes the commodity purchased at the same time together with the prediction function of the purchased commodity based on the purchase history of the customer C included by the store server 10*a*.

The customer detection apparatus 70*b* detects that a customer card issued by the store and held by the customer C is held over a predetermined card reader at the time the customer enters the retail store. As a result, the customer detection apparatus 70*b* detects that the customer C enters the retail store.

The display quantity detection apparatus 180 detects the type and quantity of the commodity that the customer C takes out from the commodity shelf by analyzing an image captured by a camera monitoring the commodity shelf.

The configuration the commodity display management system 100*b* is described below. Since the hardware structure of the store server 10*b* is the same as that (FIG. 2) of the store server 10*a*, the description thereof is omitted.

Description of the Hardware Structure of Customer Detection Apparatus

Figure 14:
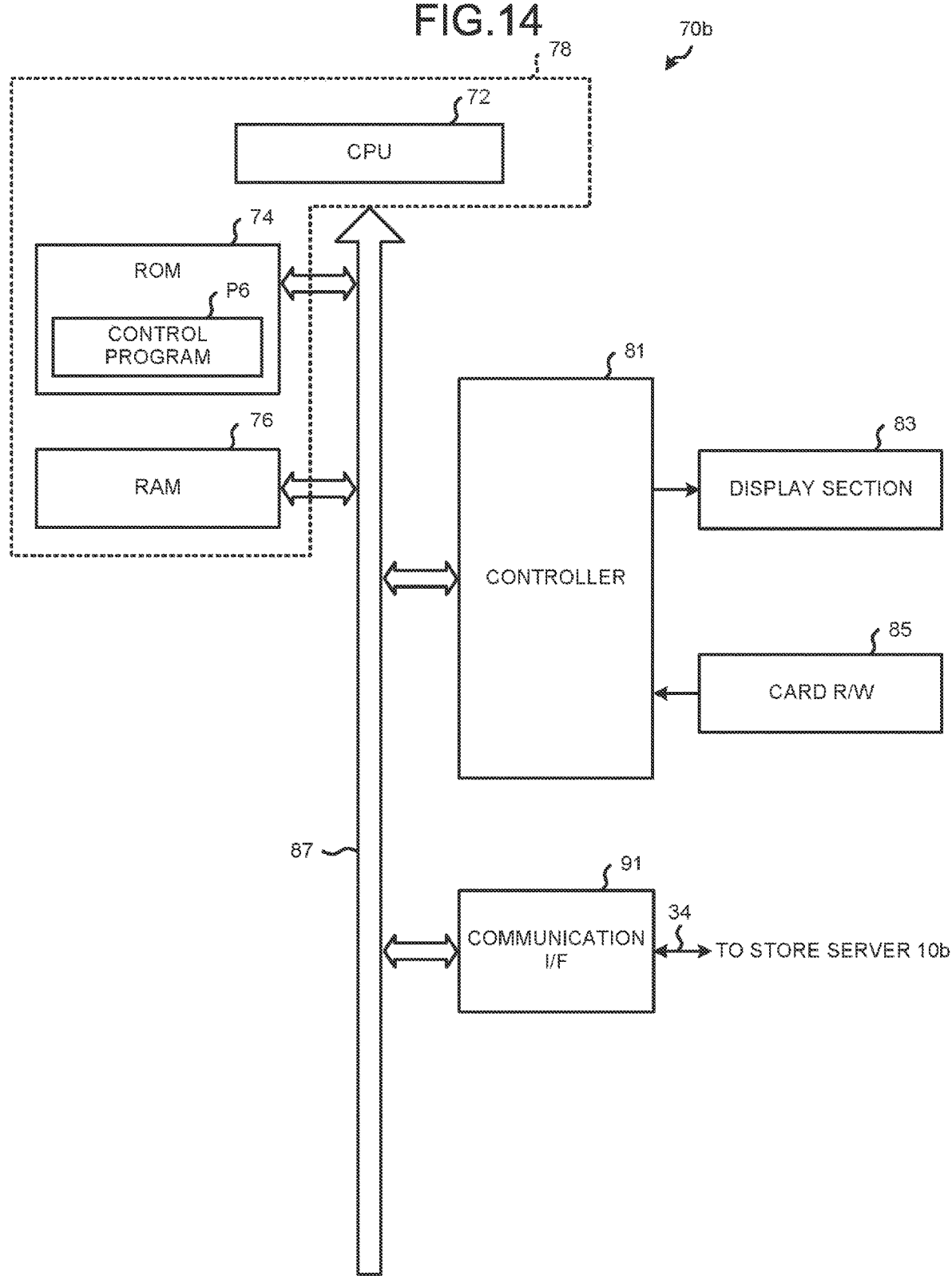
FIG. 14 is a block diagram illustrating the hardware configuration of a customer detection apparatus according to the second embodiment.

FIG. 14 is a block diagram illustrating the hardware configuration of the customer detection apparatus 70*b*. As shown in FIG. 14, the customer detection apparatus 70*b* includes the control section 78 having the same configuration as the control section 78 included in the customer detection apparatus 70*a*. The ROM 74 of the customer detection apparatus 70*b* stores a control program P6 executed by the customer detection apparatus 70*b*.

A display section 83 and a card R/W 85 are respectively connected to the customer detection apparatus 70*b* via the controller 81. The operations of these peripheral devices are all controlled by the control section 78. The display section 83 displays guidance relating to an operation method of the card R/W 85 and information indicating that the card R/W 85 reads the content of the customer card. The card R/W 85 reads information for identifying the customer C recorded on the customer card held by the customer C. Furthermore, the card R/W 85 writes a visit history indicating that the customer C visits the retail store to the customer card.

Further, the customer detection apparatus 70*b* is provided with a communication I/F 91 for executing data communication with the store server 10*b* which is a host apparatus via a communication network 34 provided in the retail store. The communication I/F 91 is connected to the internal bus line 87.

Description of Hardware Structure of Display Quantity Detection Apparatus

Figure 15:
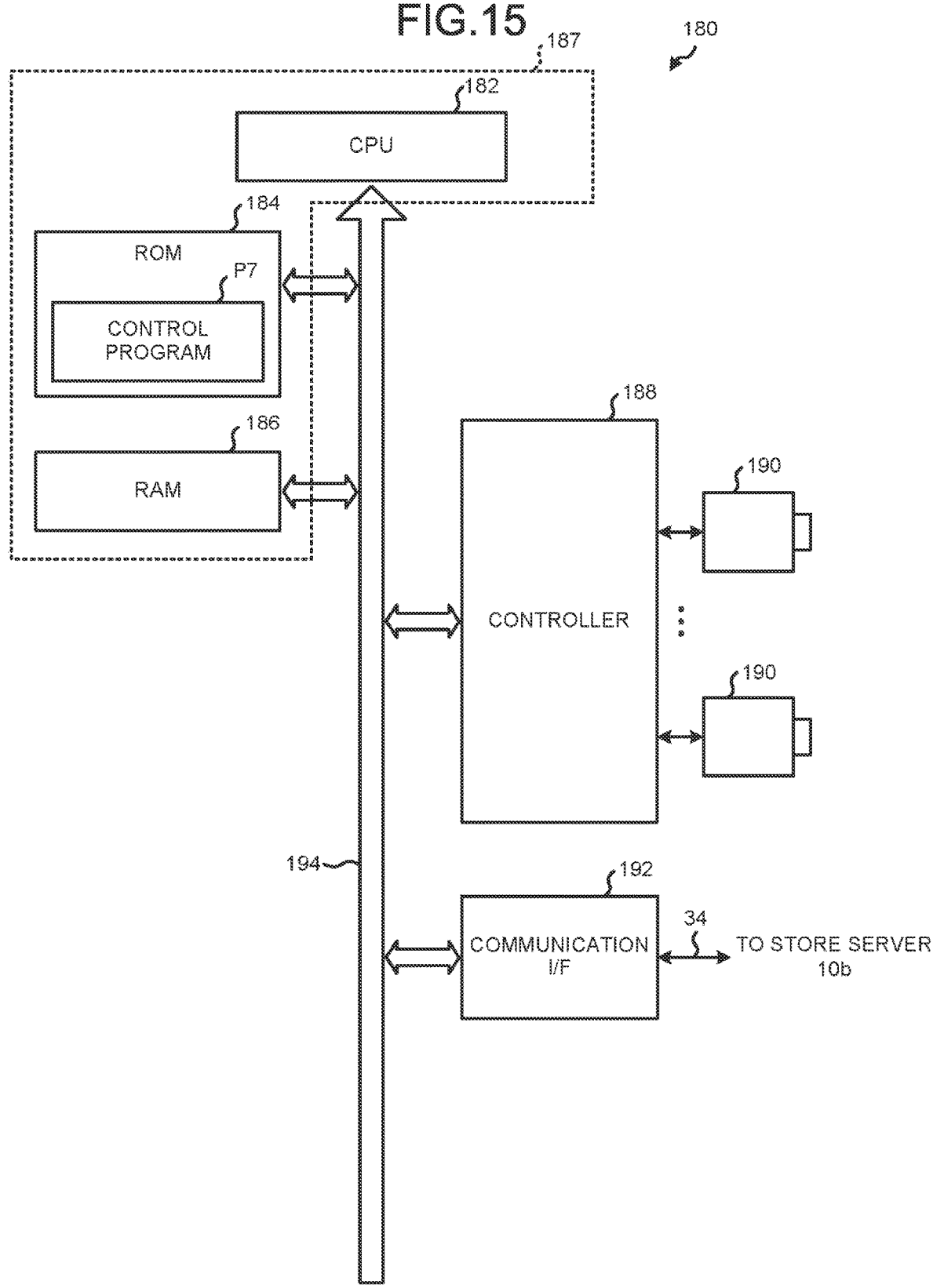
FIG. 15 is a block diagram illustrating the hardware configuration of a display quantity detection apparatus.

FIG. 15 is a block diagram illustrating the hardware configuration of the display quantity detection apparatus 180. As shown in FIG. 15, the display quantity detection apparatus 180 includes a control section 187 having a computer including a CPU 182, a ROM 184 and a RAM 186. The CPU 182 executes various processing to control each section. The ROM 184 stores data in a non-volatile manner. The RAM 186 stores variable data in a rewritable manner and is used as a work area. The CPU 182, the ROM 184 and the RAM 186 are connected via an internal bus line 194.

A control program P7 executed by the display quantity detection apparatus 180 is stored in the ROM 184. The control program P7 may be provided as a file in an installable format or an executable format in a computer-readable recording medium such as a CD-ROM, a FD (Flexible Disk), a CD-R, a DVD (Digital Versatile Disc) and the like.

A plurality of cameras 190 are connected to the display quantity detection apparatus 180 via a controller 188. The cameras 190 have the same configuration and capture images of the commodity shelf on which the commodity is displayed at the retail store. The operations of these cameras 190 are all controlled by the control section 187.

Furthermore, the display quantity detection apparatus 180 is provided with a communication I/F 192 for executing data communication with the store server 10*b* which is a host device via the communication network 34 provided in the retail store. The communication I/F 192 is connected to the internal bus line 194.

Description of Functional Component of Commodity Display Management System

Figure 16:
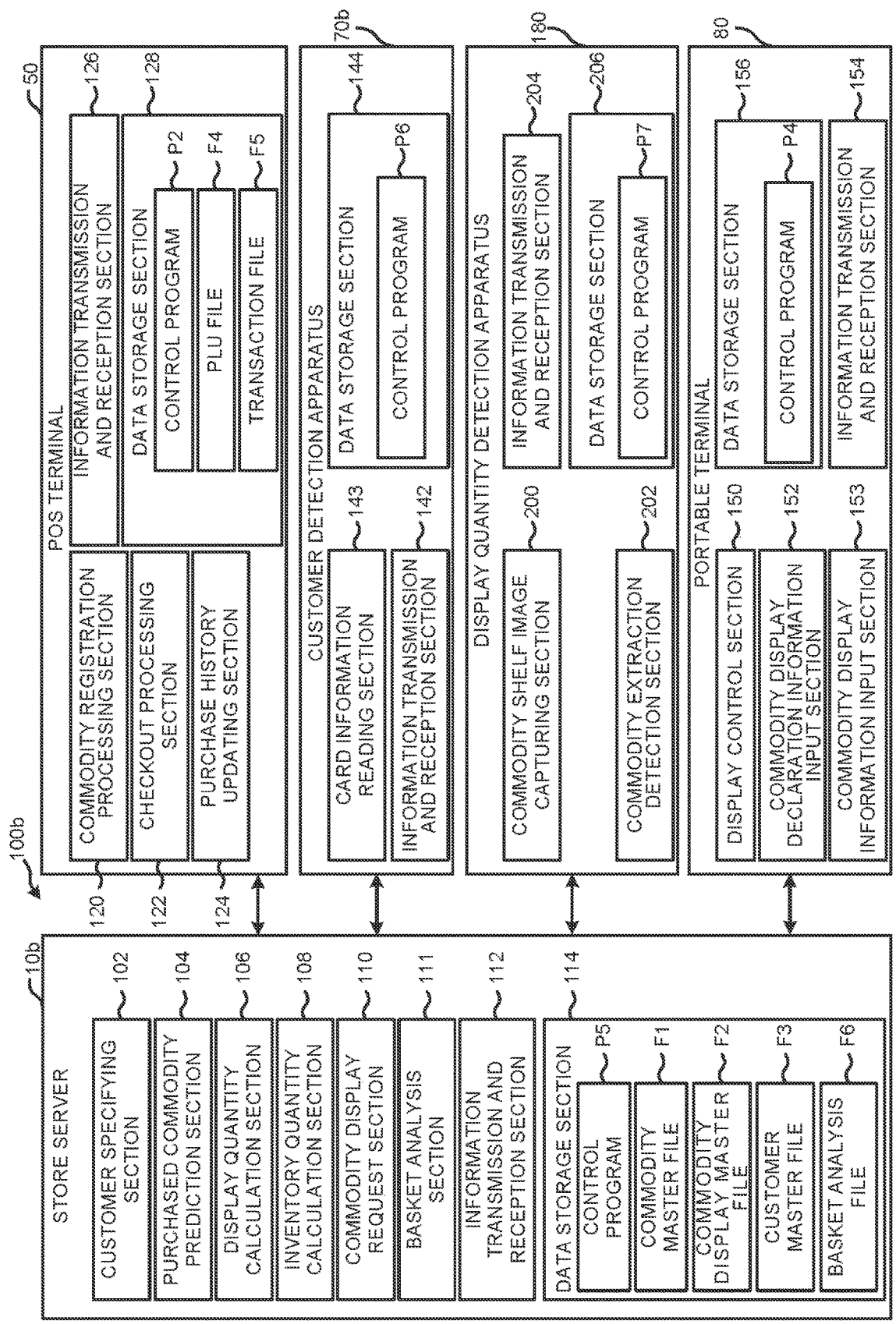
FIG. 16 is a block diagram illustrating the functional components of a commodity display management system according to the second embodiment.

Next, the functional component of the commodity display management system 100*b* is described with reference to FIG. 16. FIG. 16 is a block diagram illustrating the functional component of the commodity display management system 100*b*.

As shown in FIG. 16, the commodity display management system 100*b* includes the store server 10*b*, the POS terminal 50, the customer detection apparatus 70*b*, the display quantity detection apparatus 180, and the portable terminal 80. In order to simplify the description, the commodity display management system 100*b* is illustrated in FIG. 16 as one POS terminal 50 and one portable terminal 80, respectively, although a plurality of POS terminals 50 and a plurality of the portable terminals 80 are provided.

The CPU 12 (FIG. 2) of the store server 10*b* operates according to a control program P5 to realize the customer identifying section 102, the purchased commodity prediction section 104, the display quantity calculation section 106, the inventory quantity calculation section 108, the commodity display request section 110, a basket analysis section 111, the information transmission and reception section 112 and the data storage section 114 shown in FIG. 16 as the functional sections inside the control section 18.

The customer identifying section 102 is an example of the identifying module. Based on the detection result of the customer detection apparatus 70*b*, the customer identifying section 102 identifies an identical person as an example of the attribute of the customer C who enters the retail store.

The purchased commodity prediction section 104 is an example of the prediction module. The purchased commodity prediction section 104 predicts the commodity that the customer C is likely to purchase based on the result of identifying the identical person which is the attribute of the customer C. Specifically, the purchased commodity prediction section 104 predicts the commodity that the customer C is likely to purchase based on the past purchase history of the customer C and the analysis result of the commodity purchased together at the time the customer C shops in the past.

The display quantity calculation section 106 is an example of the calculation module. The display quantity calculation section 106 calculates how many commodities predicted by the purchased commodity prediction section 104 are currently displayed on the commodity shelf of the retail store. Specifically, the display quantity calculation section 106 calculates the current display quantity of the commodities based on the type and quantity result of the commodity taken out from the commodity shelf, which is detected by the display quantity detection apparatus 180.

The functions of the inventory quantity calculation section 108 and the commodity display request section 110 are the same as those of the inventory quantity calculation section 108 and the commodity display request section 110 of the commodity display management system 100a described above.

The basket analysis section 111 analyzes the commodity purchased together based on the purchase history of the customer C.

The information transmission and reception section 112 transmits and receives information between the store server 10b and the POS terminal 50. The information transmission and reception section 112 transmits and receives information between the store server 10b and the customer detection apparatus 70b. Further, the information transmission and reception section 112 transmits and receives information between the store server 10b and the display quantity detection apparatus 180, and between the store server 10b and the portable terminal 80. The information transmitted and received is described in detail with reference to flowcharts in FIG. 18, FIG. 19, and FIG. 20 described later.

The data storage section 114 is realized by the memory section 20 (FIG. 2) described above. The data storage section 114 stores the control program P1, the commodity master file F1, the commodity display master file F2 and the customer master file F3 which are mentioned above. Furthermore, the data storage section 114 stores a basket analysis file F6. The basket analysis file F6 stores a result of analyzing the commodity purchased together at the time the customer C purchases a certain commodity.

The function of the POS terminal 50 is as described in the first embodiment.

The CPU 72 (FIG. 13) of the customer detection apparatus 70b operates according to the control program P6 to realize a card information reading section 143 and the information transmission and reception section 142 and the data storage section 144 shown in FIG. 16 as the functional sections inside the control section 78.

The card information reading section 143 is realized by the aforementioned card R/W 85 (FIG. 14). The card information reading section 143 reads customer card information for identifying the customer C recorded in the customer card carried by the customer C.

The information transmission and reception section 142 transmits and receives information between the customer detection apparatus 70b and the store server 10b. Specifically, the customer card information is transmitted from the customer detection apparatus 70b to the store server 10b. Details are described with reference to the flowchart in FIG. 18 described later.

The data storage section 144 is realized by the aforementioned ROM 74 (FIG. 14). The data storage section 144 stores the control program P6.

The CPU 182 (FIG. 15) of the display quantity detection apparatus 180 operates according to the control program P7 to realize a commodity shelf image capturing section 200, a commodity extraction detection section 202, an information transmission and reception section 204, and a data storage section 206 shown in FIG. 16 as the functional sections inside the control section 187.

The commodity shelf image capturing section 200 is realized by the aforementioned camera 190 (FIG. 15). The commodity shelf image capturing section 200 photographs the commodity shelf on which the commodity is displayed.

The commodity extraction detection section 202 detects whether the commodity is extracted from the image of the commodity shelf captured by the commodity shelf image capturing section 200. Furthermore, the commodity extraction detection section 202 detects the type and quantity of the commodity taken out.

The information transmission and reception section 204 transmits and receives information between the display quantity detection apparatus 180 and the store server 10b. Specifically, the information on the commodity taken out from the commodity shelf is transmitted from the display quantity detection apparatus 180 to the store server 10b. The details are described with reference to the flowchart in FIG. 19 described later.

The data storage section 206 is realized by the aforementioned ROM 184 (FIG. 15). The data storage section 206 stores the control program P7.

The function of the portable terminal 80 is as described in the first embodiment.

Description of Commodity Display Request Information

Figure 17:
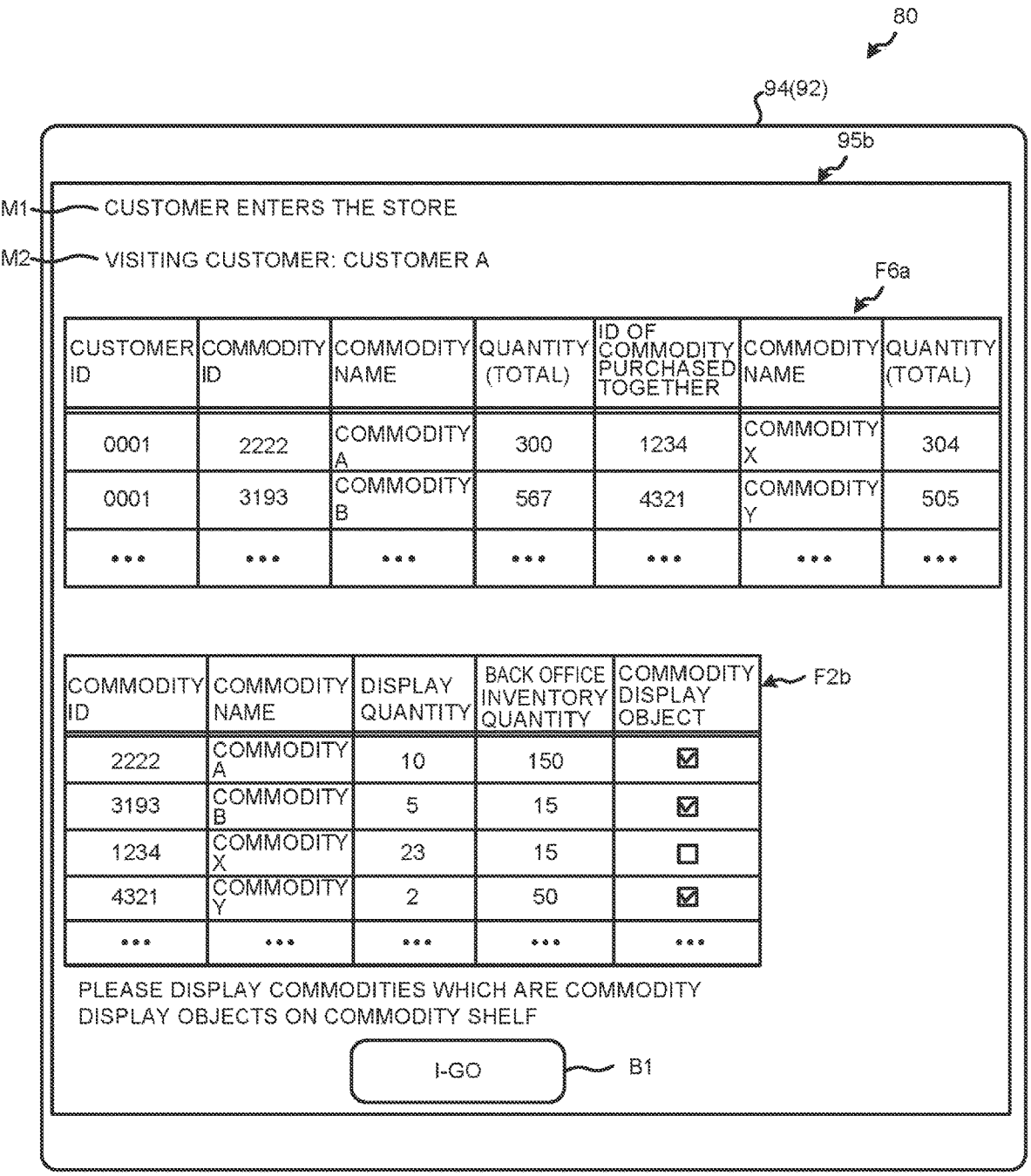
FIG. 17 is a diagram illustrating an example of a notification screen displayed on a portable terminal according to the second embodiment.

With reference to FIG. 17, the commodity display request information transmitted to the portable terminal 80 carried by the store clerk who performs the commodity display if the commodity display is necessary is described. FIG. 17 is a diagram illustrating an example of a notification screen 95b displayed on the portable terminal 80 in the present embodiment.

The display control section 150 (FIG. 16) of the portable terminal 80 receives an instruction from the commodity display request section 110 (FIG. 16) of the store server 10b and displays the notification screen 95b shown in FIG. 17 on the display section 94 (touch panel 92) of the portable terminal 80.

The notification screen 95b has the visit guidance M1, the visiting customer name M2, a basket analysis file F6a, a commodity list F2b, and the I-go button B1.

The contents of the visiting guidance M1 and the visiting customer name M2, and the function of the I-go button B1 are the same as those described in the first embodiment.

The basket analysis file F6a is a file in which a commodity A and a commodity B that the customer C purchases frequently and a commodity that is frequently purchased together with the commodity A and the commodity B are listed up from the basket analysis file F6. For example, in FIG. 17, a commodity X indicates a commodity that is frequently purchased together with the commodity A. A commodity Y indicates a commodity that is frequently purchased together with the commodity B.

The commodity list F2b is selected from among the commodity display master file F2, and is a commodity list for listing up the commodities that the customer C is likely to purchase based on the past purchase history of the customer C and the basket analysis. The commodity list F2b has the same format as the commodity display master file F2.

Description of Flow of Processing Executed by Customer Detection Apparatus and the Store Server Next, the flow of a series of processing executed by the customer detection apparatus 70b and the store server 10b is described with reference to the flowchart in FIG. 18.

First, with reference to the flowchart in FIG. 18(a), the flow of processing executed by the customer detection apparatus 70b is described. The card information reading section 143 determines whether the customer card is held over (Act S80). If it is determined that the customer card is held over (Yes in Act S80), the flow proceeds to the processing in Act S82. On the other hand, if it is determined that the customer card is not held over (No in Act S80), the processing in Act S80 is repeated.

Subsequently, the card information reading section 143 reads the customer card information recorded on the held customer card (Act S82).

The information transmission and reception section 142 transmits the customer card information read by the card information reading section 143 to the store server 10b (Act S84). Thereafter, the customer detection apparatus 70b ends the processing in FIG. 18(a). Actually, until the operation of the commodity display management system 100b is stopped, the customer detection apparatus 70b repeats the processing in FIG. 18(a).

Next, with reference to the flowchart in FIG. 18(b), the flow of processing executed by the store server 10b when the customer enters the retail store is described. First, the information transmission and reception section 112 determines whether the customer card information is received from the customer detection apparatus 70b (Act S86). If the customer card information is received (Yes in Act S86), the customer identifying section 102 compares the information of the received customer card with the customer ID (FIG. 7) stored in the customer attribute information F3a to identify the customer C (Act S88).

Based on the identifying result in Act S88, the customer identifying section 102 determines whether the customer C is the regular customer (Act S90). If it is determined that the customer C is the regular customer (Yes in Act S90), the flow proceeds to the processing in Act S92.

Next, the purchased commodity prediction section 104 reads the purchase history information F3b of the customer C (Act S92).

Furthermore, the purchased commodity prediction section 104 reads the basket analysis file F6 (Act S94).

The purchased commodity prediction section 104 predicts the commodity that the customer C is likely to purchase based on the purchase history information F3b of the customer C and the result of the basket analysis (Act S96).

The commodity display request section 110 reads the information of the commodity display master file F2 (Act S98).

The commodity display request section 110 refers to the commodity display object column f24 of the read commodity display master file F2 to determine whether there is the commodity display target article among the commodities that the customer C is likely to purchase (Act S100). If there is the commodity display target article (Yes in Act S100), the flow proceeds to the processing in Act S102.

The commodity display request section 110 transmits the commodity display request information to the portable terminal 80 (Act S102).

The commodity display request section 110 determines whether the information indicating that the I-go button B1 (FIG. 17) is pressed is received from the portable terminal 80 via the information transmission and reception section 112 (Act S104). If the information indicating that the I-go button B1 is pressed is received (Yes in Act S104), the flow proceeds to the processing in Act S106. On the other hand, if the information indicating that the I-go button B1 is pressed is not received (No in Act S104), the processing in Act S104 is repeated.

The commodity display request section 110 transmits a signal instructing deletion of the commodity display request information to the portable terminal 80 other than the portable terminal that transmits the information indicating that the I-go button B1 is pressed among the portable terminals 80 (Act S106).

The display quantity calculation section 106 determines whether the commodity information is received from the display quantity detection apparatus 180 (Act S108). If the commodity information is received (Yes in Act S108), the flow proceeds to the processing in Act S110. On the other hand, if the commodity information is not received (No in Act S108), the processing in Act S108 is repeated.

The inventory quantity calculation section 108 determines whether the commodity display information is received from the portable terminal 80 (Act S110). If the commodity display information is received (Yes in Act S110), the flow proceeds to the processing in Act S112. On the other hand, if the commodity display information is not received (No in Act S110), the processing in Act S110 is repeated.

The display quantity calculation section 106 and the inventory quantity calculation section 108 update the information of the commodity display master file F2 (Act S112). Specifically, the display quantity calculation section 106 updates the display quantity column f22 of the commodity display master file F2 based on the commodity information received in Act S108. The inventory quantity calculation section 108 updates the back office inventory quantity column f23 of the commodity display master file F2 based on the commodity display information. Thereafter, the store server 10b ends the processing in FIG. 18(b). Actually, until the commodity display management system 100b stops the operation, the store server 10b repeats the processing in FIG. 18(b).

In Act S90, if it is determined that the customer C is not the regular customer (No in Act S90), and in Act S100, if there is no need to display the commodity that the customer C is likely to purchase on the commodity shelf (No in Act S100), the flow proceeds to the processing in Act S108.

Figure 19:
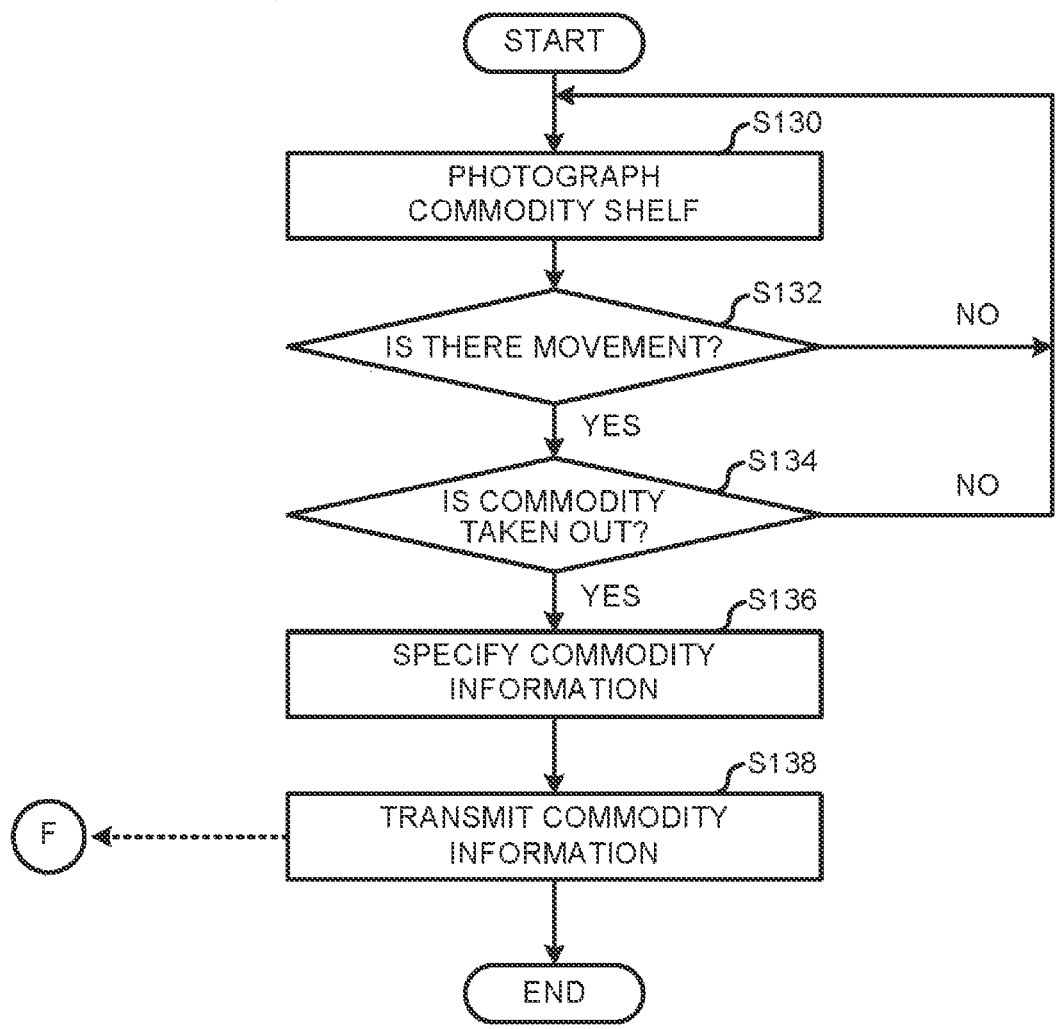
FIG. 19 is a flowchart illustrating the flow of processing executed by the display quantity detection apparatus according to the second embodiment.

Description of Flow of Processing Executed by Display Quantity Detection Apparatus Next, the flow of a series of processing executed by the display quantity detection apparatus 180 is described with reference to the flowchart in FIG. 19.

The commodity shelf image capturing section 200 photographs the commodity shelf on which the commodity is displayed (Act S130).

The commodity extraction detection section 202 detects whether there is movement in the image captured by the commodity shelf image capturing section 200 (Act S132). Specifically, a difference between images captured at predetermined time intervals is calculated by the camera 190 (FIG. 15), and when a region with brightness exceeding a predetermined threshold value is detected in the difference result, it can be determined that there is the movement. When there is the movement in the image captured by the commodity shelf image capturing section 200 (Yes in Act S132), the flow proceeds to the processing in Act S134. On the other hand, when there is no movement in the image captured by the commodity shelf image capturing section 200 (No in Act S132), the flow returns to the processing in Act S130.

The commodity extraction detection section 202 determines whether the commodity is taken out from the commodity shelf (Act S134). Specifically, the commodity extraction detection section 202 determines that the commodity is taken out if an area where the movement detected in Act S132 occurs has a shape extending in the direction of extracting the commodity. If it is determined that the commodity is taken out from the commodity shelf (Yes in Act S134), the flow proceeds to the processing in Act S136. On the other hand, if it is determined that the commodity is not taken out from the commodity shelf (No in Act S134), the flow returns to the processing in Act S130.

The commodity extraction detection section 202 identifies the commodity information taken out from the commodity shelf (Act S136). Here, the commodity information includes the commodity code and the quantity of the commodity taken out. Specifically, the commodity extraction detection section 202 detects which commodity is taken out and how many commodities the customer takes out based on the position of the movement area detected by the camera 190. It is assumed that the commodity is displayed at a determined position of the predetermined commodity shelf. Therefore, it is possible to identify the commodity taken out and the number thereof depending on the movement and the position of the camera 190 among the plurality of cameras 190 that captures the image.

The information transmission and reception section 204 transmits the commodity information identified by the commodity extraction detection section 202 to the store server 10b (Act S138). Thereafter, the display quantity detection apparatus 180 ends the processing in FIG. 19. In fact, the display quantity detection apparatus 180 repeats the processing in FIG. 19 until the operation of the commodity display management system 100b is stopped.

Figure 20:
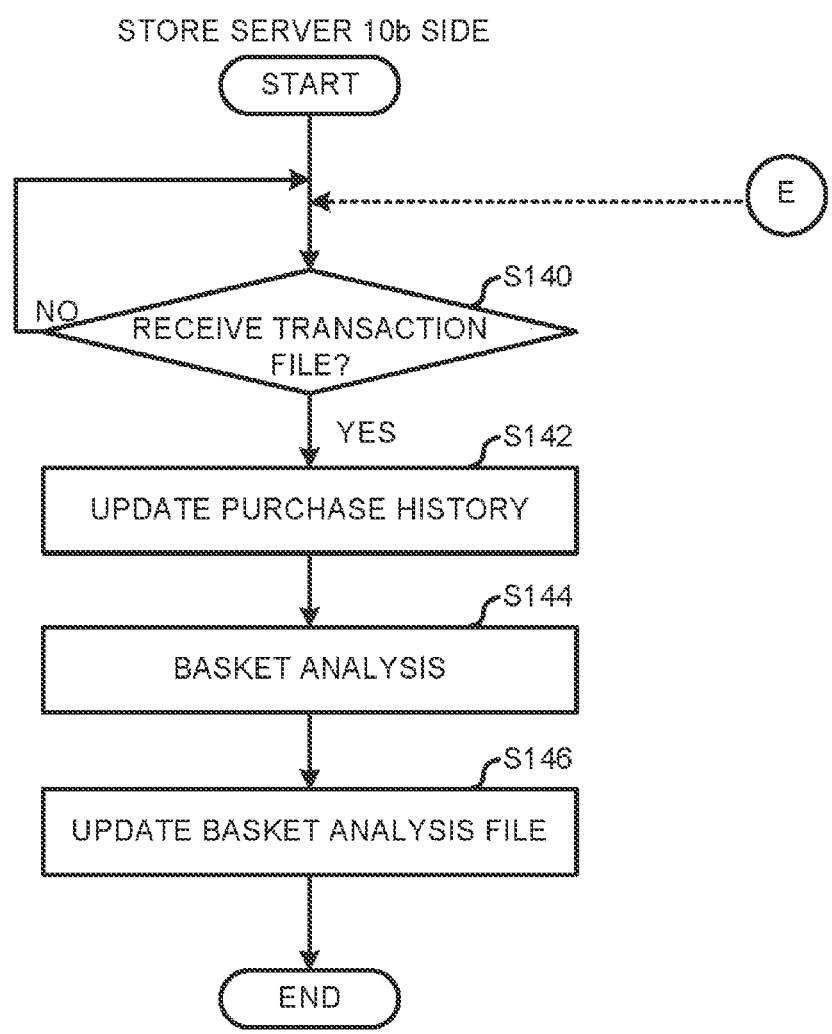
FIG. 20 is a flowchart illustrating the flow of processing executed by the store server at a predetermined time such as after closing a store according to the second embodiment.

Description of Flow of Processing Executed by Store Server at Predetermined Time such as After Closing Store Next, with reference to the flowchart in FIG. 20, the flow of a series of processing executed by the store server 10b at a predetermined time such as after closing the retail store is described.

First, the information transmission and reception section 112 determines whether the transaction file F5 is received from the POS terminal 50 (Act S140). If the transaction file F5 is received (Yes in Act S140), the flow proceeds to the processing in Act S142. On the other hand, if the transaction file F5 is not received (No in Act S140), the processing in Act S140 is repeated.

The control section 18 of the store server 10b updates the purchase history information F3b of the customer C based on the contents of the transaction file F5 (Act S142).

The basket analysis section 111 performs the basket analysis based on the purchase history of the customer C updated in Act S142 (Act S144).

Then, the basket analysis section 111 updates the basket analysis file F6 based on the result of the basket analysis (Act S146). Thereafter, the store server 10b ends the processing in FIG. 20.

Figure 11:
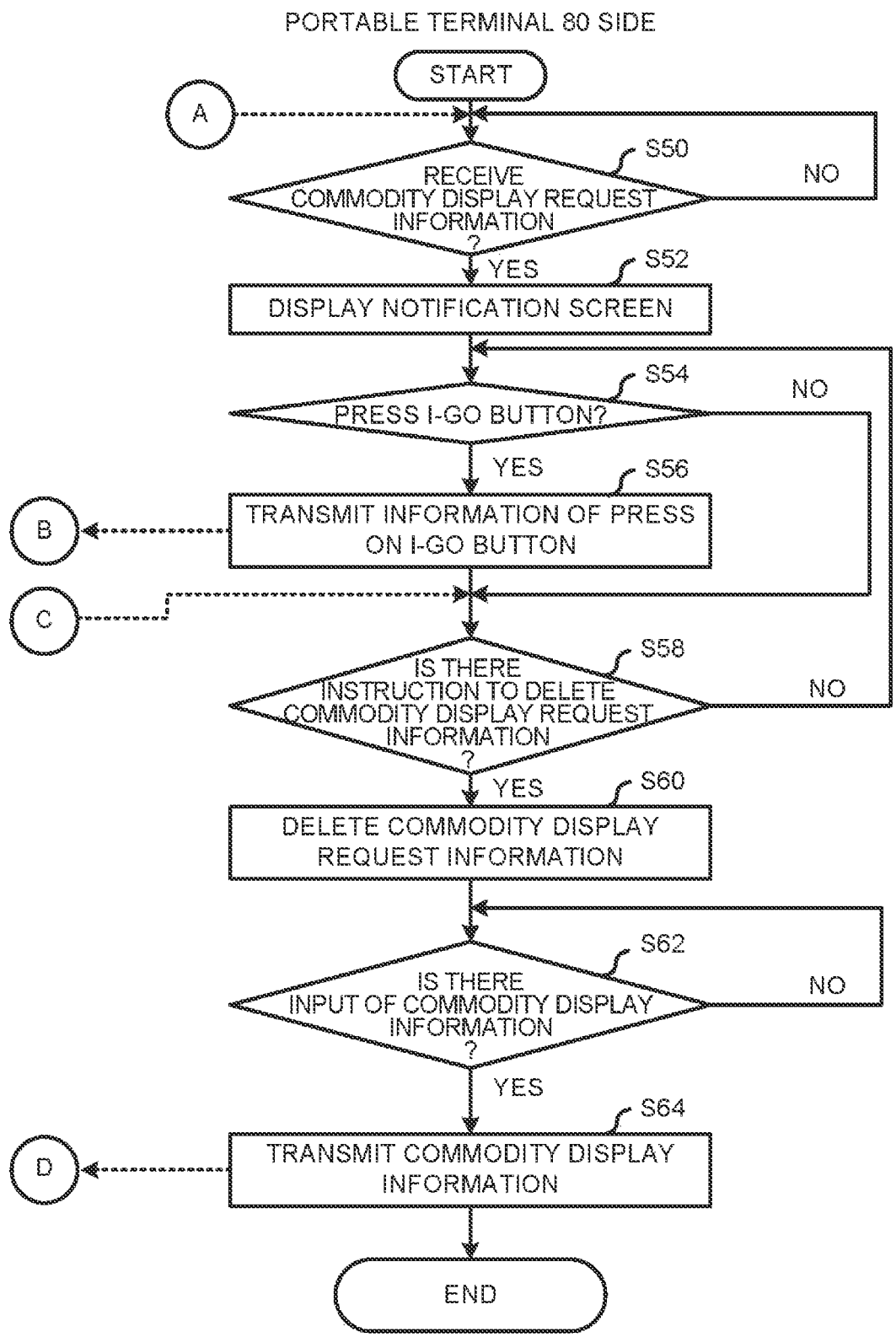
FIG. 11 is a flowchart illustrating the flow of processing executed by the portable terminal.

In the commodity display management system 100b, the flow of the processing executed by the portable terminal 80 is the same as that in the flowchart in FIG. 11. The flow of the processing executed by the POS terminal 50 is the same as that in the flowchart in FIG. 12(b). Therefore, illustration and description thereof are omitted.

As described above, according to the store serer 10b (information processing apparatus) of the second embodiment, the display quantity calculation section 106 calculates the commodity display quantity based on the commodity display quantity and the number of the commodities taken out by the customer C from the commodity shelf on which the commodity is displayed. Therefore, the display quantity of the commodities can be calculated early at the time the customer C takes it out from the commodity shelf.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

For example, if the customer C enters the store, the purchased commodity prediction section 104 may predict the commodity that the customer C is likely to purchase based on not only the purchase history of the customer C himself/herself but also the purchase history of another customer C belonging to the same category (age group, sex, occupation, etc.) as the customer C.

What is claimed is:

1. An inventory management server connectable to a store terminal for managing commodities that are on display for sale at a store, comprising:
   a network interface;
   a storage device that stores a relational database in which historical purchase data of each of customers is associated with identification data of the customer, and a processor configured to:
      track a quantity of each of the commodities and update the quantity based on sales data,
      upon receipt of customer identification information, determine the identification data corresponding to the received customer identification information and search, using the determined identification data, the relational database for the historical purchase data corresponding to the determined identification data,
      determine whether any of the displayed commodities need to be replenished based on the updated quantity thereof and the historical purchase data corresponding to the determined identification data,
      upon determining that any of the displayed commodities need to be replenished, generate request information indicating a request for replenishing the any of the displayed commodities, and
      control the network interface to transmit to the store terminal the request information, the request information causing the store terminal to display a screen showing the request and by which the request can be accepted.

2. The inventory management server according to claim 1, wherein the customer identification information is an image of a customer's face or feature data extracted therefrom.

3. The inventory management server according to claim 2, wherein the image is captured by a camera installed in the store.

4. The inventory management server according to claim 3, wherein the feature data is extracted by a face recognition apparatus configured to acquire the image from the camera.

5. The inventory management server according to claim 1, wherein the customer identification information indicates a member ID scanned by a card reader.

6. The inventory management server according to claim 1, wherein the processor is further configured to
   determine a commodity that is likely to be purchased and a quantity thereof based on the historical purchase data corresponding to the determined identification data, determine whether a sufficient quantity of the determined commodity is being displayed based on the updated quantity of the commodity, and upon determining that the sufficient quantity of the determined commodity is not being displayed, determine an additional quantity of the commodity that needs to be displayed, wherein the request information further indicates the determined additional quantity.

7. The inventory management server according to claim 6, wherein the storage device stores a stock quantity of each of the commodities, and the request information is transmitted only when the determined additional quantity of the commodity is equal to or less than the stock quantity thereof.

8. The inventory management server according to claim 6, wherein the storage device stores status information indicating whether each customer is a frequent customer, and the processor is configured to determine whether the customer associated with the determined identification data is a frequent customer based on the status information prior to determining the commodity the quantity thereof.

9. The inventory management server according to claim 8, wherein the processor determines the commodity and the quantity thereof only when the customer is determined to be a frequent customer.

10. The inventory management server according to claim 1, wherein the storage device stores the quantity of each of the commodities that is on display for sale, and upon receipt of the sales data, the quantity of each of the commodities is updated according to the received sales data.

11. An inventory management method carried out by an inventory management server connectable to a store terminal for managing commodities that are on display for sale at a store, the inventory management method comprising:

storing, in a storage device, a relational database in which historical purchase data of each of customers is associated with identification data of the customer;

tracking a quantity of each of the commodities and updating the quantity based on sales data;

upon receipt of customer identification information, determining the identification data corresponding to the received customer identification information and searching, using the determined identification data, the relational database for the historical purchase data corresponding to the determined identification data;

determining whether any of the displayed commodities need to be replenished based on the updated quantity thereof and the historical purchase data corresponding to the determined identification data;

upon determining that any of the displayed commodities need to be replenished, generating request information indicating a request for replenishing the any of the displayed commodities; and transmitting to the store terminal the request information, the request information causing the store terminal to display a screen showing the request and by which the request can be accepted.

12. The inventory management method according to claim 11, wherein the customer identification information is an image of a customer's face or feature data extracted therefrom.

13. The inventory management method according to claim 12, wherein the image is captured by a camera installed in the store.

14. The inventory management method according to claim 13, wherein the feature data is extracted by a face recognition apparatus configured to acquire the image from the camera.

15. The inventory management method according to claim 11, wherein the customer identification information indicates a member ID scanned by a card reader.

16. The inventory management method according to claim 11, further comprising:

determining a commodity that is likely to be purchased and a quantity thereof based on the historical purchase data corresponding to the determined identification data;

determining whether a sufficient quantity of the determined commodity is being displayed based on the updated quantity of the commodity; and upon determining that the sufficient quantity of the determined commodity is not being displayed, determining an additional quantity of the commodity that needs to be displayed, wherein the request information further indicates the determined additional quantity.

17. The inventory management method according to claim 16, further comprising:

storing in the storage device a stock quantity of each of the commodities, wherein the request information is transmitted only when the determined additional quantity of the commodity is equal to or less than the stock quantity thereof.

18. The inventory management method according to claim 16, further comprising:

storing in the storage device status information indicating whether each customer is a frequent customer; and determining whether the customer associated with the determined identification data is a frequent customer based on the status information prior to determining the commodity and the quantity thereof.

19. The inventory management method according to claim 18, wherein the commodity and the quantity thereof are determined only when the customer is determined to be a frequent customer.

20. The inventory management method according to claim 11, further comprising:

storing in the storage device the quantity of each of the commodities that is on display for sale, wherein upon receipt of the sales data, the quantity of each of the commodities is updated according to the received sales data.

* * * * *